United States Patent
Ard et al.

(10) Patent No.: US 11,513,764 B2
(45) Date of Patent: Nov. 29, 2022

(54) WIRELESS ENABLED LOAD CONTROL DEVICE WITH VOICE CONTROLLER

(71) Applicant: Leviton Manufacturing Co., Inc., Melville, NY (US)

(72) Inventors: Aaron Ard, New Orleans, LA (US); James Shurte, New Orleans, LA (US); Thomas M. Morgan, New Orleans, LA (US); Ronald J. Gumina, New Orleans, LA (US)

(73) Assignee: Leviton Manufacturing Co., Inc., Melville, NY (US)

( * ) Notice: Subject to any disclaimer, the term of this patent is extended or adjusted under 35 U.S.C. 154(b) by 0 days.

(21) Appl. No.: 16/771,074

(22) PCT Filed: Nov. 6, 2018

(86) PCT No.: PCT/US2018/059333
§ 371 (c)(1),
(2) Date: Jun. 9, 2020

(87) PCT Pub. No.: WO2019/133108
PCT Pub. Date: Jul. 4, 2019

(65) Prior Publication Data
US 2021/0028954 A1    Jan. 28, 2021

Related U.S. Application Data

(63) Continuation-in-part of application No. 15/855,475, filed on Dec. 27, 2017, now abandoned.

(51) Int. Cl.
*G06F 15/173* (2006.01)
*G06F 3/16* (2006.01)
(Continued)

(52) U.S. Cl.
CPC ............ *G06F 3/167* (2013.01); *H04L 12/282* (2013.01); *H04L 12/2818* (2013.01);
(Continued)

(58) Field of Classification Search
None
See application file for complete search history.

(56) References Cited

U.S. PATENT DOCUMENTS 3,958,869 A * 5/1976 Beck ...................... G03B 31/00
352/1
4,514,789 A    4/1985 Jester
(Continued)

FOREIGN PATENT DOCUMENTS

DE    102011088653 A1    6/2013
WO    2012093412 A1    7/2012
(Continued)

OTHER PUBLICATIONS

International Search Report and Written Opinion for the International Patent Application No. PCT/US20/58642, dated Mar. 26, 2017, 14 pages.
(Continued)

*Primary Examiner* — Umar Cheema
*Assistant Examiner* — Gregory P Tolchinsky
(74) *Attorney, Agent, or Firm* — KDB

(57) ABSTRACT

A wireless enabled load control device having integrated voice control is disclosed. The load control device may be connected to a variety of local and remote devices, including lighting devices and smart appliances, as well as various cloud service platforms. The load control device may receive a voice command from a user. The load control device may transmit the voice command to a first cloud service platform for processing to determine an instruction included in the voice command. The determined instruction
(Continued)

US 11,513,764 B2

Page 2 may be provided to a second cloud service platform connected to the first cloud service platform. The first and second cloud service platforms may be connected to a device to be controlled based on the voice command. The cloud service platforms can adjust an operation of the device based on the determined instruction.

13 Claims, 11 Drawing Sheets

(51) Int. Cl.
| | |
|---|---|
| H04L 12/28 | (2006.01) |
| H04L 67/125 | (2022.01) |
| H05B 45/00 | (2022.01) |
| H05B 47/19 | (2020.01) |
| H05B 47/195 | (2020.01) |
| H05B 47/115 | (2020.01) |
| H05B 47/12 | (2020.01) |

(52) U.S. Cl.
CPC ........... H04L 67/125 (2013.01); H05B 45/00 (2020.01); H05B 47/115 (2020.01); H05B 47/12 (2020.01); H05B 47/19 (2020.01); H05B 47/195 (2020.01); G05B 2219/2642 (2013.01)

(56) References Cited

U.S. PATENT DOCUMENTS

| | | | |
|---|---|---|---|
| 4,654,745 A | 3/1987 | Corby | |
| 4,939,792 A | 7/1990 | Urbish et al. | |
| D310,814 S | 9/1990 | Rosenbaum et al. | |
| D310,815 S | 9/1990 | Watson et al. | |
| D312,611 S | 12/1990 | Watson et al. | |
| 5,079,559 A | 1/1992 | Umetsu et al. | |
| 5,206,657 A | 4/1993 | Downey et al. | |
| 5,239,205 A | 8/1993 | Hoffman et al. | |
| 5,336,979 A | 8/1994 | Watson et al. | |
| 5,340,954 A | 8/1994 | Hoffman et al. | |
| 5,436,421 A | 7/1995 | Sadowski et al. | |
| 5,485,058 A | 1/1996 | Watson et al. | |
| D369,143 S | 4/1996 | Sorenson et al. | |
| 5,565,855 A | 10/1996 | Knibbe | |
| 5,570,085 A | 10/1996 | Bertsch et al. | |
| 5,621,283 A | 4/1997 | Watson et al. | |
| 5,637,964 A | 6/1997 | Hakkarainen et al. | |
| D389,461 S | 1/1998 | Mayo et al. | |
| D389,805 S | 1/1998 | Mayo et al. | |
| D391,924 S | 3/1998 | Mayo et al. | |
| 5,736,965 A | 4/1998 | Mosebrook et al. | |
| D395,037 S | 6/1998 | Mayo et al. | |
| 5,818,128 A | 10/1998 | Hoffman et al. | |
| 5,838,226 A | 11/1998 | Houggy et al. | |
| 5,842,032 A | 11/1998 | Bertsch et al. | |
| 5,844,516 A | 12/1998 | Viljanen et al. | |
| 5,848,054 A | 12/1998 | Mosebrook et al. | |
| 5,938,757 A | 8/1999 | Bertsch | |
| D416,871 S | 11/1999 | Todd | |
| 5,982,103 A | 11/1999 | Mosebrook et al. | |
| 6,011,226 A | 1/2000 | Sadowski et al. | |
| 6,013,885 A | 1/2000 | Kowalczyk | |
| 6,326,754 B1 | 12/2001 | Mullet et al. | |
| 6,397,288 B1 | 5/2002 | Rye et al. | |
| 6,423,900 B1 | 7/2002 | Soules | |
| 8,340,975 B1 | 12/2012 | Rosenberger | |
| 9,978,547 B1 | 5/2018 | Wisniewski et al. | |
| 10,386,891 B2 | 8/2019 | Allen et al. | |
| 10,852,771 B2 | 12/2020 | Allen et al. | |
| 2004/0202343 A1 | 10/2004 | Rye et al. | |
| 2008/0001549 A1 | 1/2008 | Altonen et al. | |
| 2011/0129097 A1* | 6/2011 | Andrea | G10K 11/175 381/71.6 |
| 2013/0257315 A1 | 10/2013 | Restrepo et al. | |
| 2014/0246218 A1 | 9/2014 | Shotey | |
| 2014/0262848 A1* | 9/2014 | Fathollahi | H05K 5/02 206/37 |
| 2015/0078555 A1* | 3/2015 | Zhang | H04S 1/00 381/26 |
| 2015/0156598 A1* | 6/2015 | Sun | H04N 7/15 348/14.07 |
| 2015/0215747 A1* | 7/2015 | Kemmerer, Jr. | H04W 4/08 455/518 |
| 2015/0256355 A1 | 9/2015 | Pera et al. | |
| 2015/0341072 A1* | 11/2015 | Lai | H04M 1/026 455/575.8 |
| 2016/0036143 A1 | 2/2016 | Motohashi et al. | |
| 2016/0110154 A1 | 4/2016 | Qureshi et al. | |
| 2016/0219682 A1 | 7/2016 | Altonen et al. | |
| 2017/0027043 A1 | 1/2017 | Greene et al. | |
| 2017/0188437 A1 | 6/2017 | Banta | |
| 2017/0208657 A1 | 7/2017 | Jensen | |
| 2017/0271921 A1 | 9/2017 | Lombardi et al. | |
| 2018/0054688 A1* | 2/2018 | Cartwright | A61B 5/1118 |
| 2018/0063249 A1 | 3/2018 | Nguyen | |
| 2018/0084627 A1 | 3/2018 | Recker et al. | |
| 2018/0124903 A1 | 5/2018 | Strods et al. | |
| 2018/0145844 A1 | 5/2018 | Pera et al. | |
| 2018/0211656 A1* | 7/2018 | Chong | G10L 17/00 |
| 2018/0228006 A1 | 8/2018 | Baker et al. | |
| 2018/0302235 A1 | 10/2018 | Cregg et al. | |
| 2019/0027875 A1 | 1/2019 | Parks | |
| 2019/0124752 A1 | 4/2019 | Kelly | |
| 2019/0130707 A1* | 5/2019 | Gruber | H04L 67/26 |
| 2019/0228923 A1 | 7/2019 | Li | |
| 2020/0037422 A1 | 1/2020 | Shivell | |

FOREIGN PATENT DOCUMENTS

| | | |
|---|---|---|
| WO | 2012094722 A1 | 7/2012 |
| WO | 2015184193 A1 | 12/2015 |
| WO | 2018/148315 A1 | 8/2018 |
| WO | 2019084391 A1 | 5/2019 |
| WO | 2021133467 A1 | 7/2021 |

OTHER PUBLICATIONS

International Search Report and Written Opinion for the International Patent Application No. PCT/US2020/036765, dated Aug. 28, 2020, 14 pages.
International Search Report and Written Opinion for the International Patent Application No. PCT/US2018/059333, dated Jan. 18, 2019.
Petchel, Megan., "iDevices® and Hubbell Incorporated Debut First Co- Developed Technology Products at the 2018 Consumer Electronics Show (CES)" iDevices Blog, Jan. 9, 2018.
U.S. Appl. No. 62/455,973 Specification, Claims, Abstract, Drawings with Filing Receipt, filed Feb. 7, 2017, 42 pages.
"Ecobee is building Alexa into its thermostats and light switches", https://techcrunch.com/2017/05/03/ecobee-is-building-alexa-into-its-thermostats-and-light-switches/, May 3, 2017.
"ecobee_Switch+_ecobee_Smart_Home_Technology2-website_ecobee", https://www.ecobee.com/switch-plus/, downloaded on May 23, 2018.
U.S. Appl. No. 15/855,475—Non-Final Office Action dated Dec. 12, 2019, 23 pages.
International Search Report and Written Opinion for the International Patent Application No. PCT/US21/71739, dated Jan. 27, 2022, 16 pages.
Author Unknown., "The Anywhere Switch/Switch Kit" Leviton Mfg. Co., Inc. 2013, 2 pages.
Author Unknown., "Seco-Larm SD-7202GC-PEQ Enforcer LED Illuminated RTE Single-gang Wall Plate with Large Green Button, Large Illuminated Push Button with Caption "Push To Exit", Pushbutton Rated 10A at 125 to 250VAC" Seco-Larm®—retrieved May 7, 2019—URL: https://www.amazon.com/Seco-Larm-SD-7202GC-PEQ-Illuminated-Single-gang-Pushbutton/dp/B0051BUGCA/

(56) References Cited

OTHER PUBLICATIONS ref=sr_1_1?crid=3DJETQGDS3II8&keywords=seco-larm%2Bsd-7202gc-peq&qid=1653064565&sprefix=-larm%2BSD-7%2Caps%2C98&sr=8-1&th=1.

* cited by examiner

WIRELESS ENABLED LOAD CONTROL DEVICE WITH VOICE CONTROLLER

CROSS-REFERENCE TO RELATED APPLICATIONS

This application is a United States National Phase filing of International Application No. PCT/US2018/059333, filed 6 Nov. 2018, which is a continuation-in-part of pending U.S. patent application Ser. No. 15/855,475, filed Dec. 27, 2017, entitled "Wireless Enabled Load Control Device with Voice Controller", each application is hereby incorporated by reference into the present application in their entirety.

FIELD OF THE DISCLOSURE

The present disclosure relates generally to a load control device and, more particularly, to a wireless enabled load control device having integrated voice control.

BACKGROUND OF THE DISCLOSURE

Conventional wireless enabled lighting devices may be controlled by a variety of devices including a virtual assistant. For example, operation of conventional wireless enabled lighting devices may be adjusted through voice commands detected by the virtual assistant. Specifically, the virtual assistant may provide access to a remote voice service that can decipher voice commands and control operation of the conventional wireless enabled lighting devices though a wireless connection such as Wi-Fi.

While voice control of such conventional wireless enabled lighting devices provides flexibility, it requires a separate handheld or desktop stand-alone virtual assistant. Further, outages, software bugs, failures, etc. associated with the virtual assistant may adversely affect the functionality and use of the controllable lighting devices, thereby reducing a user's satisfaction with voice control of the lighting devices. Moreover, the separate handheld or desktop stand-alone virtual assistant may not be located in the same area or room as the user or load.

Thus, it would be desirable to provide a load control device having the ability to receive and process voice commands to control operation of a variety of devices, including lighting devices, without requiring a separate, stand-alone voice control interface conventionally provided through a virtual assistant.

In addition, it would be desirable to provide a voice-control interface that is mounted in a conventional wall box (e.g., single gang wall box of a conventional switch or receptacle).

SUMMARY OF THE INVENTION

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

The present disclosure is directed to a wireless enabled load control device having integrated voice control. The load control device may be connected to a variety of local and remote devices, including lighting devices and smart appliances, as well as various cloud service platforms. In one embodiment, the load control device may receive a voice command from a user. The load control device may transmit the voice command to a first cloud service platform for processing to determine an instruction included in the voice command. The determined instruction may be provided to a second cloud service platform connected to a device to be controlled based on the voice command. The second cloud service platform can adjust an operation of the device based on the determined instruction.

BRIEF DESCRIPTION OF THE DRAWINGS

By way of example, specific embodiments of the disclosed device will now be described, with reference to the accompanying drawings, in which.

DETAILED DESCRIPTION

Figure 1:
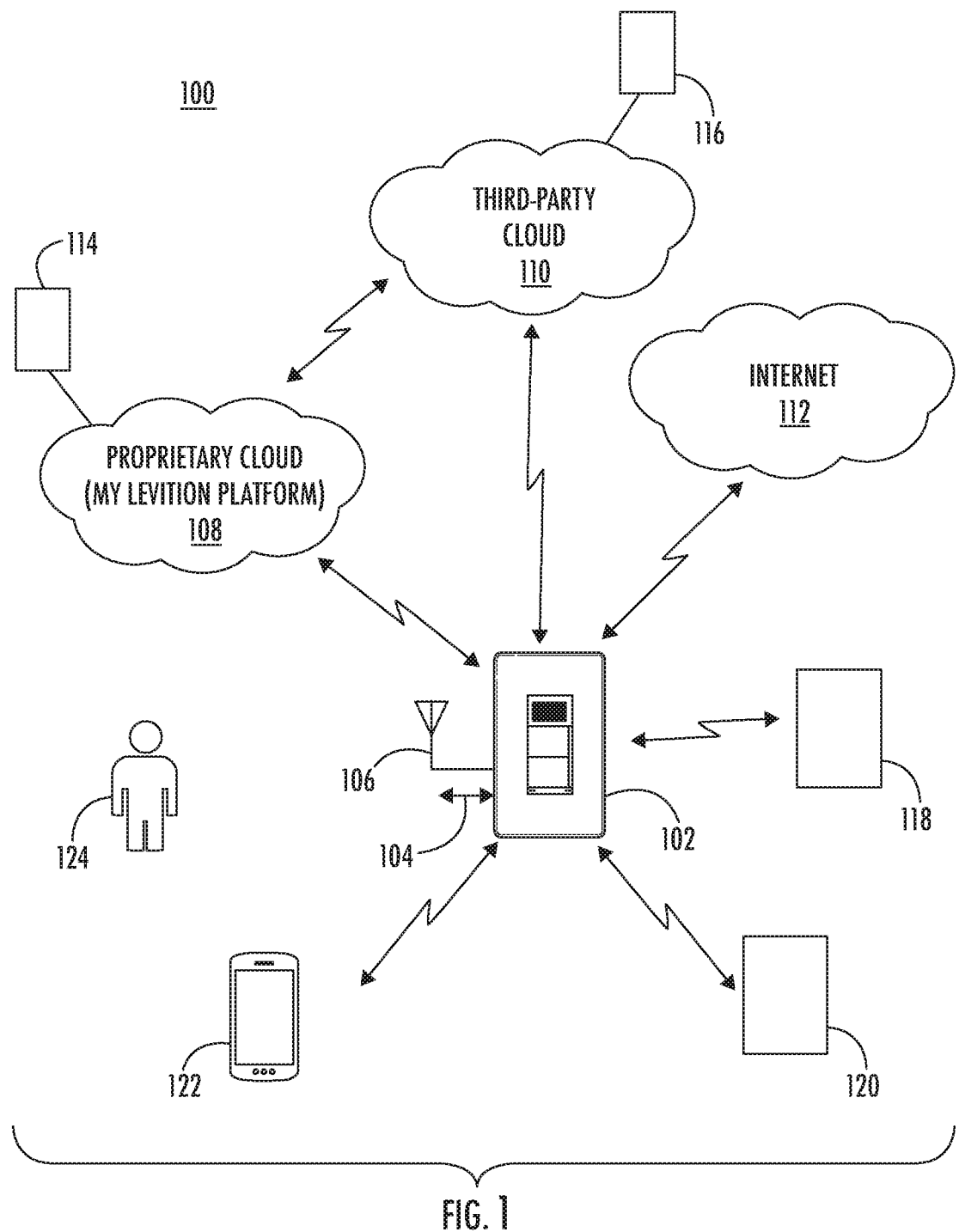
FIG. 1 illustrates an exemplary operating environment for a load control device having integrated voice control.

A device, system and method in accordance with the present disclosure will now be described more fully hereinafter with reference to the accompanying drawings, in which preferred embodiments of the device, system and method are shown. The disclosed device, system and method, however, may be embodied in many different forms and should not be construed as being limited to the embodiments set forth herein. Rather, these embodiments are provided so that this disclosure will be thorough and complete, and will fully convey the scope of the devices, system and method to those skilled in the art. In the drawings, like numbers refer to like elements throughout.

FIG. 1 illustrates an exemplary operating environment 100 for a load control device having integrated voice control 102. As illustrated, the load control device 102 may be an in-wall load control device that may be coupled to, inter alia, any type of lighting load for controlling the lighting load. The load control device 102 may be, for example, a dimmer or ON/OFF switch, either one of any design or style such as rocker, toggle, return to neutral, etc. The operating environment 100 illustrates some of the types of devices, services, platforms, and/or networking components to which the load control device 102 may be connected, either directly or indirectly. The load control device 102 and portions of the operating environment 100 may be provided within the same physical space such as, for example, a home, an office, a retail space, a warehouse, etc.

The load control device 102 enables a user—for example, through physical or voice implemented inputs—to control, inter alia, local and remote lighting or other load devices. For example, in one embodiment, the load control device 102 may be used to turn ON/OFF or dim UP/DOWN, local and remote lighting devices or systems. Control of automation activities and lighting scenes involving the local and remote lighting devices or systems may also be provided by user interaction with the load control device 102. The load control device 102 may further provide a user with access to proprietary (e.g., affiliated with the load control device 102) and/or third-party service platforms such as, for example, cloud service platforms as described further herein.

As shown in FIG. 1, the load control device 102 may include one or more wired connections 104 for coupling to one or more devices. In use, the wired connection 104 may be used to supply electrical power to the connected device such as, for example, a local lighting device, system or load (used interchangeably herein without the intent to limit). Alternatively, or in addition, the wired connection 104 may be used to facilitate communication to the connected device over any known wired communication standard or protocol. Example wired connections and/or protocols may include, for example, fiber optic connections, DSL, Ethernet, cable connections, telephone line connections, etc. The load control device 102 may also include one or more wireless communication connections 106 to facilitate communication to a connected device over any known wireless communication standard or protocol. Example wireless connections and/or protocols may include, for example, Wi-Fi (e.g., any IEEE 802.11 a/b/g/n network), Bluetooth, Bluetooth Low Energy, Near-Field Communication, any cellular communication standard, any infrared communication protocol, etc.

The load control device 102 may communicate wirelessly over any frequency within any licensed or unlicensed frequency band (e.g., over a 2.4 GHz operating frequency band or a 5 GHz operating frequency band). The load control device 102 may implement any known security or encryption protocol or standard such as, for example, WPA or WPA2. The load control device 102 may also communicate, either directly or indirectly, with other devices or components including, for example, those depicted in FIG. 1 (e.g., either over a wired or wireless connection) and/or may communicate with other devices or components depicted in FIG. 1 through one or more intermediate devices or components (such as, for example, a cellular base station, a Wi-Fi router, a cloud service or platform, etc.). The load control device 102 may also communicate with a wireless remote-control device such as, for example, a remote load control device (e.g., a remote switch positioned in another area or room of a home or office thus enabling multi-way control), a mobile device 122, etc.

As further shown in FIG. 1, the load control device 102 may be connected to a proprietary cloud service and/or platform 108. The proprietary cloud service and/or platform 108 may be any proprietary cloud service and/or platform associated or affiliated with the load control device 102 such as, for example, a company's proprietary cloud service (herein referred to as the "My Leviton" platform). The load control device 102 may also be connected to one or more third-party cloud services or platforms 110 (herein further referred to as a "cloud service platform") including, for example, the Amazon cloud service platform. Other third-party cloud service platforms 110 may include security systems or services (e.g., ADT, etc.) or environmental control systems (e.g., NEST, etc.). The load control device 102 may also be connected to the Internet 112.

The load control device 102 may operate to transmit and receive data from each of the My Leviton platform 108, any third-party cloud service platform 110, and the Internet 112, or any device connected thereto. As illustrated, in one embodiment, the My Leviton platform 108 may be connected to the cloud service platform 110 so that data may be transmitted between the My Leviton platform 108 and the third-party cloud service platform 110. For example, in one embodiment, data (including instructions) may be transmitted from the load control device 102 to the My Leviton platform 108 and then to the third-party cloud service platform 110 and/or from the load control device 102 to the third-party cloud service platform 110 and then to the My Leviton platform 108 to control one or more local or remote devices.

Referring to FIG. 1, the My Leviton platform 108 may be coupled to a first remote device 114 and the third-party cloud service platform 110 may be coupled to a second remote device 116, although it is envisioned that the My Leviton Platform 108 and the third-party cloud service platform 110 may be connected to any number of devices. The first remote device 114 and the second remote device 116 may be located, for example, in a remote location from the location of the load control device 102 (e.g., separated by a relatively large physical distance so as not be considered located in the same environment as the load control device 102). Alternatively, the first and second remote devices 114, 116 may be located in the same general area or location. The first and second remote devices 114 and 116 may be any type of electronic device including any "smart" device. The first and second remote devices 114 and 116 may be identical devices or, alternatively, may be different types of devices.

Through connectivity with the My Leviton platform 108, the load control device 102 may communicate with and/or control the first remote device 114. In one embodiment, the first remote device 114 may be a remote light or lighting system. Alternatively, the first remote device 114 may be any other smart device, Wi-Fi-enabled device, Internet-of-Things (IoT) device, IFTTT device, or any other device coupled to the My Leviton platform 108. Accordingly, the load control device 102 may be used to transmit and receive data (including instructions) with the first remote device 114 and/or to control the first remote device 114. For example, in one embodiment, the load control device 102 may be used to turn ON/OFF or dim UP/DOWN the first remote device (e.g., remote light or lighting system) 114.

Similarly, through connectivity with the third-party cloud service platform 110, either directly via a connection between the load control device 102 and the third-party cloud service platform 110, or via cloud-to-cloud connectivity between, for example, the My Leviton platform 108 and the third-party cloud service platform 110, the load control device 102 may communicate with and/or control the second remote device 116. In one embodiment, the second remote device 116 may be any type of device including, for example, a smart thermostat, a smart sensor, a smart device, Wi-Fi-enabled device, IoT device, IFTTT device, or any other type of smart appliance.

In one embodiment, the load control device 102 may be used to transmit and receive data (including instructions or control information) with the first remote device 114 through direct communications with the My Leviton platform 108. In one embodiment, the load control device 102 may be used to transmit and receive data (including instructions or control information) with the first remote device 114 through communication with the third-party cloud service platform 110 that then communicates and interacts with the My Leviton platform 108. Similarly, in one embodiment, the load control device 102 may be used to transmit and receive data (including instructions or control information) with the second remote device 116 through direct communications with the third-party cloud service platform 110. In one embodiment, the load control device 102 may be used to transmit and receive data (including instructions or control information) with the second remote device 116 through communication with the My Leviton platform 108 that then communicates with the third-party cloud service platform 110.

In addition, or alternatively, the load control device 102 may be connected to one or more local devices. As illustrated, the load control device 102 may be connected to first and second local devices 118, 120, although it is envisioned that the load control device 102 may be connected to more or less local devices. The first and second local devices 118 and 120 may be physically located within the same area or environment as the load control device 102—for example, within the same room, home, office, retail space, or warehouse. The first and second local devices 118 and 120 may be identical devices or, alternatively, may be different types of devices. In use, the local devices 118, 120 may be any device including, for example, Wi-Fi-enabled devices, Wi-Fi enabled lighting devices, IoT devices, smart devices, IFTTT devices, etc.

In one embodiment, the first local device 118 may be any lighting device including, for example, any light fixture, light system, LED light or lighting system, fluorescent light or lighting system, smart lighting device or system, Wi-Fi-enabled lighting device or system, Wi-Fi plug-in coupled lighting device or system, etc. In use, the load control device 102 may control the first local device (e.g., lighting device or system) 118. For example, in one embodiment, the load control device 102 may be used to turn ON/OFF or dim UP/DOWN the first local device (e.g., local lighting device or system) 118. The load control device 102 may control the first local device (e.g., lighting device or system) 118 through, for example, local networking communications (e.g., Wi-Fi control within a home). Alternatively, the load control device 102 may control the first local device (e.g., lighting device) 118 through the My Leviton platform 108, through the third-party cloud service platform 110, the Internet 112, etc., or any combination thereof. Alternatively, the load control device 102 may be hardwired to the first local device (e.g., lighting device) 118.

In one embodiment, the second local device 120 may be any type of smart device or IoT device including, for example, a smart thermostat or any smart appliance (e.g., any IoT-enabled device). The load control device 102 may control the second local device 120 through, for example, local networking communications (e.g., Wi-Fi control within a home). Alternatively, the load control device may control the second local device 120 through the My Leviton platform 108, the third-party cloud service platform 110, the Internet 112, etc., or any combination thereof. Alternatively, the load control device 102 may be hardwired to the second local device 120.

The load control device 102 may be connected to the first and second local devices 118 and 120 through any wired or wireless connection (e.g., one of the wired connections 104 and/or one or the wireless connections 106). Alternatively, and/or in addition, the load control device 102 may be connected to the first and second local devices 118 and 120 through a single cloud service platform, or through connectivity between two or more cloud service platforms. The load control device 102 may transmit and receive data with the first and second local devices 118 and 120. The load control device 102 may control operation of first and second local devices 118 and 120. As with connectivity to the remote devices 114 and 116, the load control device 102 can provide connectivity for control of the local devices 118 and 120, for example through wired or wireless connection 104, 106, through a single cloud service platform, or through connectivity between two or more cloud service platforms.

In one embodiment, to adjust an operation of a first local device (e.g., a local lighting device) 118, the load control device 102 can transmit instruction information to the third-party cloud 110 for processing which then transmits the instruction information to the My Leviton platform 108 for implementation (e.g., direct adjustment of the operation of the first local device 118 based on the instruction). In this way, voice service processes can be provided by the third-party cloud 110 while implementation of the determined instruction can go through the My Leviton platform 108.

As shown in FIG. 1, the load control device 102 may also be connected to a remote-control device 122 such as, for example, a mobile device, a remote switch, etc. The mobile device 122 may be any mobile device now known or hereafter developed including, for example, a smartphone, tablet, notebook, laptop, netbook, or other mobile computing device capable of communicating wirelessly with one or more wireless communication networks. The mobile device 122 may be used to control or interact with the load control device 102. For example, an application (app) running on the mobile device 122 may be used to control the load control device 102 and/or any other lighting device (e.g., the first local device (lighting device or system) 118 or the first remote device (lighting device or system) 114) through communications with the load control device 102. The mobile device 122 may also be used to control or interact with the local or remote non-lighting devices such as the second remote device 116 and/or the second local device 120 through the load control device 102. The load control device 102 may transmit and receive data from the mobile device 122. Such data may include information regarding any device or service connected directly or indirectly to the load control device 102.

In use, a user 124 may interact with the load control device 102. The load control device 102 may include one or more user input components to facilitate interaction with the user 124. For example, the load control device 102 may include one or more microphones for receiving voice commands, instructions, or queries from the user 124. The load control device 102 may also include one or more actuators, such as, for example, a touch sensitive device, a touch screen or one or more buttons or other physically manipulated inputs, for receiving commands or instructions from the user 124. In use, the load control device 102 enables the user 124 to control any of the local or remote devices connected thereto including, for example, the first and second remote devices 114, 116, as well as the first and second local devices 118, 120. In use, the user 102 may interface with remote platforms and/or services such as, for example, the My Leviton platform 108 or the third-party cloud service platform 110, through interaction with the load control device 102.

The load control device 102 may exchange data with each of the devices coupled thereto, either directly or indirectly through one or more of the platforms or services, thus enabling the user 124 to interact with and/or control each of these devices by issuing commands, instructions, or queries through the load control device 102. As such, the user 124 may control any device including, for example, any local or remote lighting device or system, connected to the load control device 102. The user 124 may also control any other type of device including, for example, any local device (e.g., smart device, IoT device) connected to the load control device 102. Additionally, the user 124 may control any remote lighting device connected to the load control device 102 through, for example, any proprietary or third-party cloud or service (e.g., the My Leviton platform 108 and/or the third-party cloud service platform 110) or other communications network. The user 124 may also control any other type of remote device (e.g., smart device, IoT device) connected to the load control device 102 through, for example, any proprietary or third-party cloud or service (e.g., the My Leviton platform 108 and/or the third-party cloud service platform 110) or other communications network. Communications with any device may be provided over one or more wired networks, one or more wireless networks, or any combination thereof.

The load control device 102 may process received commands from the user 124 locally, remotely, or in any combination thereof. In one embodiment, voice instructions can be received and initially processed by the load control device 102 (e.g., prepared for remote transmission) and then interpreted remotely (e.g., by the My Leviton platform 108 and/or the third-party cloud service platform 110). In one embodiment, voice instructions can be received and fully processed by the load control device 102 (e.g., instructions for control of local lighting devices).

Figure 2:
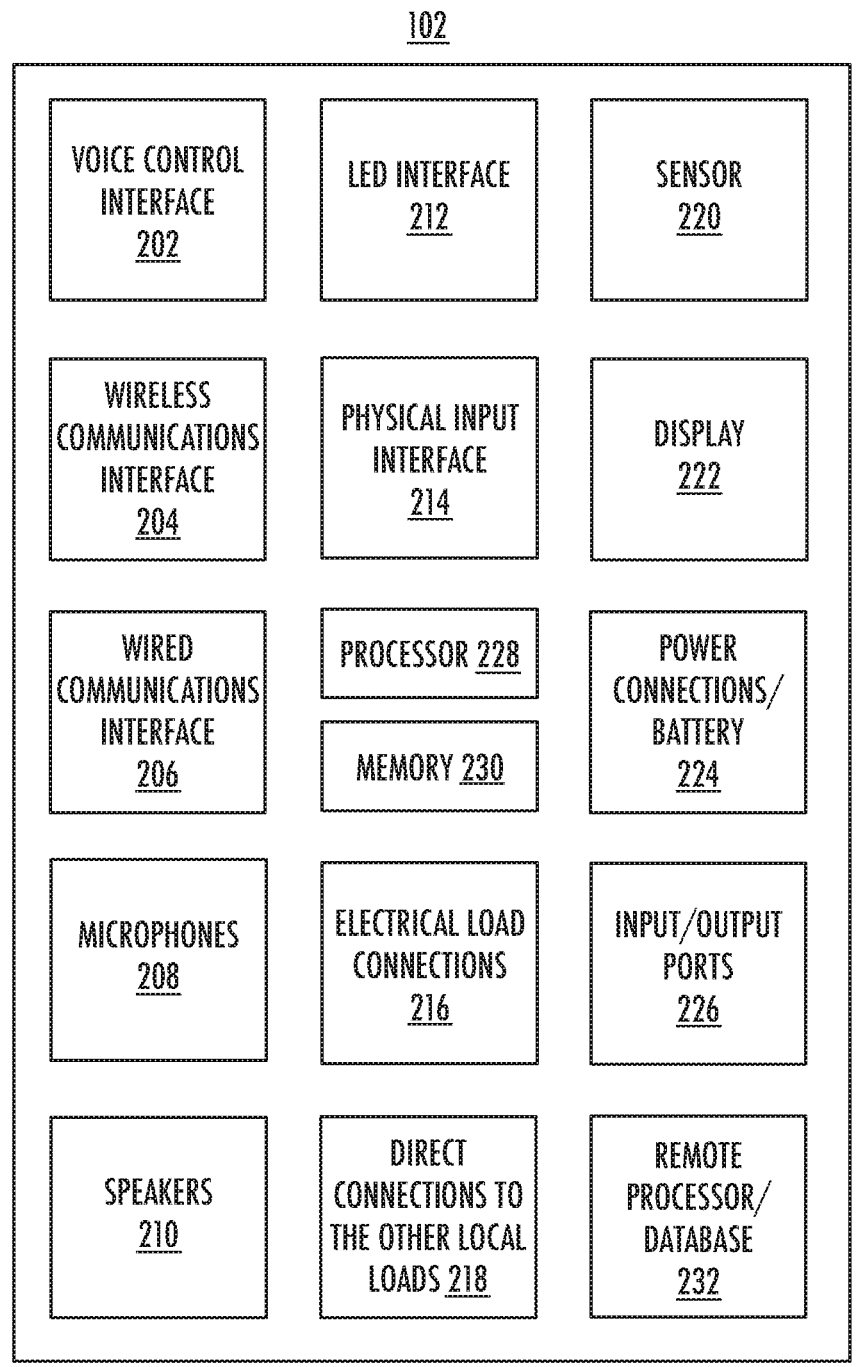
FIG. 2 illustrates a block diagram of exemplary functional components of the load control device of FIG. 1.

FIG. 2 illustrates an exemplary embodiment of the load control device 102. Specifically, FIG. 2 provides a block diagram of exemplary functional components that may be incorporated into the load control device 102. As shown, the load control device 102 may include a voice control interface 202. The voice control interface 202 may be used by the load control device 102 to receive voice commands or instructions from the user 124 to control the load control device 102 and/or any device identified by the voice command or instruction. The voice control interface 202 may receive and determine voice commands and queries from the user 124. In various embodiments, the voice control interface 202 may interface with a remote cloud service platform (e.g., the My Leviton platform 108 and/or the third-party cloud service platform 110) to interpret and respond to voice controls or queries from the user 124. In various embodiments, the voice control interface 202 may provide the capability to interpret and respond to voice controls or queries from the user 124. For purposes of discussion, descriptions of the voice control interface 202 herein may include local and/or remote voice processing and response capabilities (e.g., processing may be provided entirely locally at the local control device 102, processing may be provided remotely by a cloud service platform, and/or some combination thereof).

In one embodiment, the voice control interface 202 may listen for one or more "activation" words or signals. Upon hearing the activation word or signal, the voice control interface 202 will begin actively listening for a command or query and implement associated instructions. The voice control interface 202 may be a commercially-offered voice control interface such as, for example, Amazon Alexa, Google Assistant, Microsoft Cortana, or Samsung Bixby.

In various embodiments, the voice control interface 202 may be capable of distinguishing speakers—for example, the voice control interface 202 may be able to identify and distinguish different authorized users of the load control device 102. In various embodiments, the voice control interface 202 may determine which speaker to listen to and/or prioritize when multiple speakers are simultaneously verbally communicating with the load control device 102. For example, the voice control interface 202 may be implemented such that it listens and follows instructions from an adult rather than a child. That is, the voice control interface 202 may be capable of determining an identity of a particular person speaking to the load control device 102. The load control device 102 may identify and distinguish users and implement voice commands and/or respond to queries based on an established hierarchy of users.

In various embodiments, the voice control interface 202 can operate to follow or listen to the speaker who voiced the most recent command or query. For example, if two speakers issue a command to the load control device 102, then the most recently issued command will be followed and processed by the load control device 102. For example, in an embodiment where the load control device 102 is coupled to a remote switch, multiple speakers may simultaneously communicate with the load control device 102 and remote switch, respectively, the voice control interface 202 can be configured to follow or listen to the speaker who voiced the most recent command or query.

In various embodiments, the load control device 102 can provide presence detection such that the presence of a person within a building or room can be detected (e.g., based on voice detection, motion detection, learned activity processing, etc.). Lighting control can then be based on any determined presence detection. In various embodiments, the load control device 102 can provide various levels of access control, depending upon the person interacting with the load control device 102. For example, users of the load control device 102 can be categorized, with different categories providing relatively increased or decreased control capabilities for the load control device 102 and any device coupled thereto. In an example, an unknown or unverified user of the load control device 102 may only be able to control local lighting devices while being unable to control any remotely coupled device. In contrast, an identified and authenticated "master" user of the load control device 102 may be granted access or ability to control any device connected to the load control device 102 and can even reconfigure the load control device 102.

The voice control interface 202 may understand and process voice control commands such that any of the other devices or services depicted in FIG. 1 may be accessed or controlled. For example, the voice control interface 202 may relay received voice commands to control local devices 118 and 120 (e.g., to turn ON/OFF lighting device 118 or adjust a setting for thermostat device 120). As a further example, the voice control interface 202 may relay received voice commands to control remote devices 114 and 116 (e.g., to turn ON/OFF lighting device 114 or adjust a setting for thermostat device 116). The voice control interface 202 may follow voice control commands to provide links to the My Leviton platform 108 or the third-party cloud service platform 110.

The load control device 102 may include a wireless communications interface 204. The wireless communications interface 204 may include the wireless communication connection 106 depicted in FIG. 1. The wireless communications interface 204 may provide interfaces for communicating with any local or remote device or network through any wireless communication technology.

The load control device 102 may include a wired communications interface 206. The wired communications interface 206 may include the wired communications connection 104 depicted in FIG. 1. The wired communications interface 206 may provide interfaces for communicating with any local or remote device or network through any wired communication technology.

The load control device 102 may include one or more microphones 208. The microphone 208 may detect audible commands and queries from the user 124. The microphone 208 may provide received audio information to the voice control interface 202 for processing. The load control device 102 may further include one or more speakers 210. The speaker 210 may output audio information to the user 124. The audio information may include synthesized voices from the voice control interface 202 and other audible information such as music or an alarm.

The load control device 102 may further include a light emitting diode (LED) interface 212. The LED interface 212 may include one or more LEDs. The LED interface 212 may provide and adjust a visual display based on an operational state of the load control device 102 and/or any service platform, or voice service coupled thereto (e.g., to indicate processing of a command, powering up, powering off, etc.). The LED interface 212 may provide a way for communicating information to the user 124 visually by adjusting the visual state of any LEDs coupled thereto.

The load control device 102 may further include a physical input interface 214 for interfacing with one or more physical inputs that may be manipulated by the user 124. The physical input interface 214 may include or may be coupled to a variety of inputs including a keyboard, push buttons, or slides. The physical input interface 214 may provide a way for the user 124 to communicate information to the load control device 102, for example, to adjust operation of the load control device 102.

The load control device 102 may also include an electrical load connection 216 providing electrical connectivity to the load controlled by the load control device 102. Coupled loads may include any type of load such as, for example, a lighting load including, for example, an incandescent bulb, an LED bulb, a CFL bulb, an EVL, a Resistive, Halogen, Fluorescent, etc., an inductive load, ½ HP motor, etc.

The load control device 102 may include additional connections to other local loads 218. The connections to other local loads 218 enables the load control device 102 to directly control other local loads including, for example, other local lighting devices. Accordingly, the additional connections to other local loads 218 allows the user 124 to adjust operation of other nearby lighting devices without requiring communications through other wired or wireless communication channels (e.g., through Wi-Fi or cloud based services or components).

The load control device 102 may also include a sensor 220. The sensor 220 may be physically attached to and part of the load control device 102 (e.g., located within a housing of the load control device 102) or may be coupled to the load control device 102 by a wired or wireless communications connection (e.g., remote to the load control device 102). The sensor 220 may be any type of sensor including a temperature sensor, humidity sensor, light sensor, motion sensor, occupancy sensor, smoke detector, gas sensor, etc. The sensor 220 may detect conditions or physical attributes of a localized space surrounding the sensor 220 and may provide an indication of the same to the load control device 102. Received information from the sensor 220 may be used to control or adjust operation of any of the devices coupled to the load control device 102, for example, those depicted in FIG. 1. Received information from the sensor 220 may be relayed to the user 124 (e.g., through an audible signal from the load control device 102, through a visible signal from the load control device 102, by providing information to an app on the mobile device 122, etc.) or to any other device depicted in FIG. 1.

The load control device 102 may also include a display 222. The display 222 may include a visual display that may render visual information and a display controller for controlling the rendering of any visual information. The visual information may be any graphical or textual information. The display 222 may include a touchscreen or a touch-sensitive display. Accordingly, the display 222 may provide visual information to the user 124 and/or may receive input from the user 124. The display 222 can be part of the LED interface 212 or can be separate therefrom. In various embodiments, the display 222 and/or the LED interface 212 can include an LCD interface.

The load control device 102 may also include a power source 224. The power source 224 may include electrical power connections and/or a battery 224. The power source 224 may provide power to any of the constituent functional components of the load control device 102 depicted in FIG. 2. The power source 224 may be coupled to the power supply of the physical space in which the load control device 102 operates and may provide battery backup during power failures or outages.

In one embodiment, the load control device 102 may be a single gang line voltage powered device with power source connections that include the following connections: line input, load, traveler, ground, and neutral. The load control device 102 may provide hard-wired multi-way applications that may interact with a remote control (e.g., a wireless digital remote control).

The load control device 102 may also include one or more input/output ports 226. The input/output ports 226 may include any number and type of input and/or output ports including USB, HDMI, A/V, and a speaker/headphone jack. The input/output ports 226 provide alternative manners for communicating with the constituent functional components of the load control device 102 depicted in FIG. 2 or provide alternative ways of providing outputs from any of the same.

The load control device 102 may further include a processor circuit 228 and an associated memory component 230. The memory component 230 may store one or more programs for execution by the processor circuit 228 to implement one or more functions or features of the load control device 102 as described herein. Further, the processor circuit 228 may maintain a real-time clock for the load control device 102. The processor circuit 228 may be implemented using any processor or logic device. The memory component 230 can be implemented using any machine-readable or computer-readable media capable of storing data, including both volatile and non-volatile memory, and may reside internal or external to the load control device 102.

The processor circuit 230 may implement the functionalities of any of the components depicted in FIG. 2 or may control or adjust operation of any of the depicted components. Each component depicted in FIG. 2 may be coupled to the processor circuit 228 as well as any other depicted component. The depicted components may be implemented in hardware or software as appropriate, or any combination thereof.

The load control device 102 may further include one or more remote processor circuits and/or one or more remote databases 232. In various embodiments, the remote processor and database 232 may be located within the same physical environment as the load control device 102 (e.g., coupled to the load control device 102 and located within a basement or storage area of a home or office) or may be located in a separate, physically distinct environment. The remote processor and/or database 232 can provide supplemental computing power and extended memory to enhance the performance of the load control device 102 without affecting the relatively small size and form factor of the load control device 102.

The load control device 102 may provide one or more of the following exemplary features, functions, and capabilities based on the constituent functional components depicted in FIG. 2 in conjunction with the devices, services, network architecture, and other components depicted in the operating environment 100 of FIG. 1.

For example, in one embodiment, the load control device 102 may include a voice control interface to integrate IoT and/or smart functionality into everyday activities. In this manner, the load control device 102 may provide a seamless and integrated architectural solution for providing voice control and/or access to, for example, local and remote devices, the My Leviton platform, the Internet, and third-party platform providers such as, for example, Amazon to provide voice control for a residence, office, retail space, etc.

Additional, and/or alternatively, the load control device 102 enables connection and/or control of directly connected local and/or remote lighting devices, or through, for example, the My Leviton platform (e.g., either directly to the My Leviton platform or through a third-party cloud service platform). The load control device may enable monitoring and control operation of local and remote lighting devices through received voice commands and/or physical inputs such as, for example, manual actuation of one or more buttons. In addition, the load control device may enable a user to trigger automation activities and lighting scenes with respect to the local or remote lighting devices.

Additional, and/or alternatively, the load control device 102 may recognize and implement voice commands and/or respond to queries by linking a user to any of the components depicted in FIG. 1.

Additional, and/or alternatively, the load control device 102 may issue commands to and/or collect data from other local devices within a common operating environment (e.g., a home, office, retail space, etc.). Additional, and/or alternatively, the load control device 102 may issue commands to and/or collect data from remote devices connected by way of a cloud based service or platform, such as, for example, a proprietary cloud service and/or platform (e.g., My Leviton), a third-party proprietary cloud connections or services (e.g., Amazon, etc.). Commands may be issued based on received voice commands. Collected data may be presented to a user by the load control device 102.

In general, the load control device 102 may be connected to any device including, for example, any device able to communicate with to the my Leviton platform, third-party proprietary cloud connections or services, Internet-enabled device, communications enabled (wireless or wired) device, smartphone, mobile device, tablet, laptop, personal computer, IFFFT device, partner IoT device (e.g., Samsung SmartThings, Nest devices, etc.), any smart Wi-Fi device, etc. Such devices include connectivity and interfaces therewith and may be provided locally or remotely based on any of the communications interfaces described herein. Connectivity to cloud service platforms may be provided though the load control device 102.

In one embodiment, local and remote lighting devices may be controlled or adjusted based on received voice commands. For example, a query regarding the operational state of a remote lighting device may be issued by a user and detected by the integrated voice controller (e.g., voice control interface 202) of the load control device 102 (e.g., a user may ask "Is my office light on?" to the load control device 102). The load control device 102, based on connectivity to the remote lighting device through, for example, a proprietary cloud platform or service (e.g., my Leviton platform—either directly or through a third-party cloud platform or service such as Amazon cloud platform), may determine the operational state of the remote lighting device. Once determined, the operational state of the remote lighting device may be provided to the user (e.g., by an audible announcement and/or visual display). Further, the load control device 102 may adjust the operational state of the remote lighting device based on received voice commands (e.g., turn OFF the remote lighting device if instructed to do so by the user). Local lighting devices may also be controlled based on direct connectivity, home networking architectures (e.g., Wi-Fi), and/or through a proprietary cloud platform or service (e.g., my Leviton platform). Accordingly, local and remote lighting devices may be controlled to turn ON/OFF or adjust dimming settings and to adjust any automation of control of the same.

Additional, and/or alternatively, the load control device 102 may be used to implement any preprogrammed activities or scenes. The activities or scenes may be activated either via voice-command or physical manipulation of an input device (e.g., button). For example, voice commands may be used to turn ON, turn OFF, or change dimming settings for any connected localized or remote lighting device. In this manner, automation activities and scenes (e.g., what lights to turn off and dim) may be set using voice commands. Some exemplary activities and/or scenes may include: turning a group of lights ON or OFF; dimming a group of lights; providing one or more lighting modes including, for example, a goodnight mode (e.g., upon activation, an automatic setting or voice-activated setting may turn certain lights ON or OFF and/or dim certain lights while also adjusting the setting of a heating, ventilation, and air conditioning (HVAC) system (e.g., via IFTTT or direct integration); providing an away mode (e.g., upon activation, an automatic setting or voice-activated setting may turn certain lights OFF and/or dim certain lights while also adjusting the setting of a HVAC system (e.g., via IFTTT or direct integration); etc. Further lighting modes can also be established and managed such as a return home mode, a good morning mode, etc. in which certain groups of lights are controlled according to a schedule, time of day, or user activity.

Additional, and/or alternatively, by connecting the load control device 102 to one or more proprietary or third-party cloud service platforms, the load control device 102 may be able to provide a number of other services including, for example, home or office temperature/HVAC control, ability to order products or services, health and wellness monitoring and services, news and information products and services, etc.

Additional, and/or alternatively, by connecting the load control device 102 to a landline or cellular service, phone calls can be routed through the load control device 102 such that a user may establish an outgoing call or answer an incoming call.

Additional, and/or alternatively, by connecting the load control device 102 to a computing device (e.g., the mobile device 122), the load control device 102 and any device connected to the load control device 102 either directly or indirectly can be controlled and configured via an app (e.g., the My Leviton App) residing on the computing device, including initiating or allowing automatic firmware updates (e.g., OTA updates).

Additional, and/or alternatively, the load control device 102 may be configured via, for example, the app to include the following: forward/reverse phase control; ability to set load types, fade rates, min/max levels, preset level, etc.; load control interface for ON/OFF (including ON with Fade Time and OFF with Fade Time); support downloadable dimming curves for new load types; etc. In addition, the load control device may incorporate additional functionality including, for example, enhanced management of connected devices based on behavioral learning for a particular user; enhanced speech recognition applications; and occupancy sensing using acoustic sensing/microphones.

Figure 3:
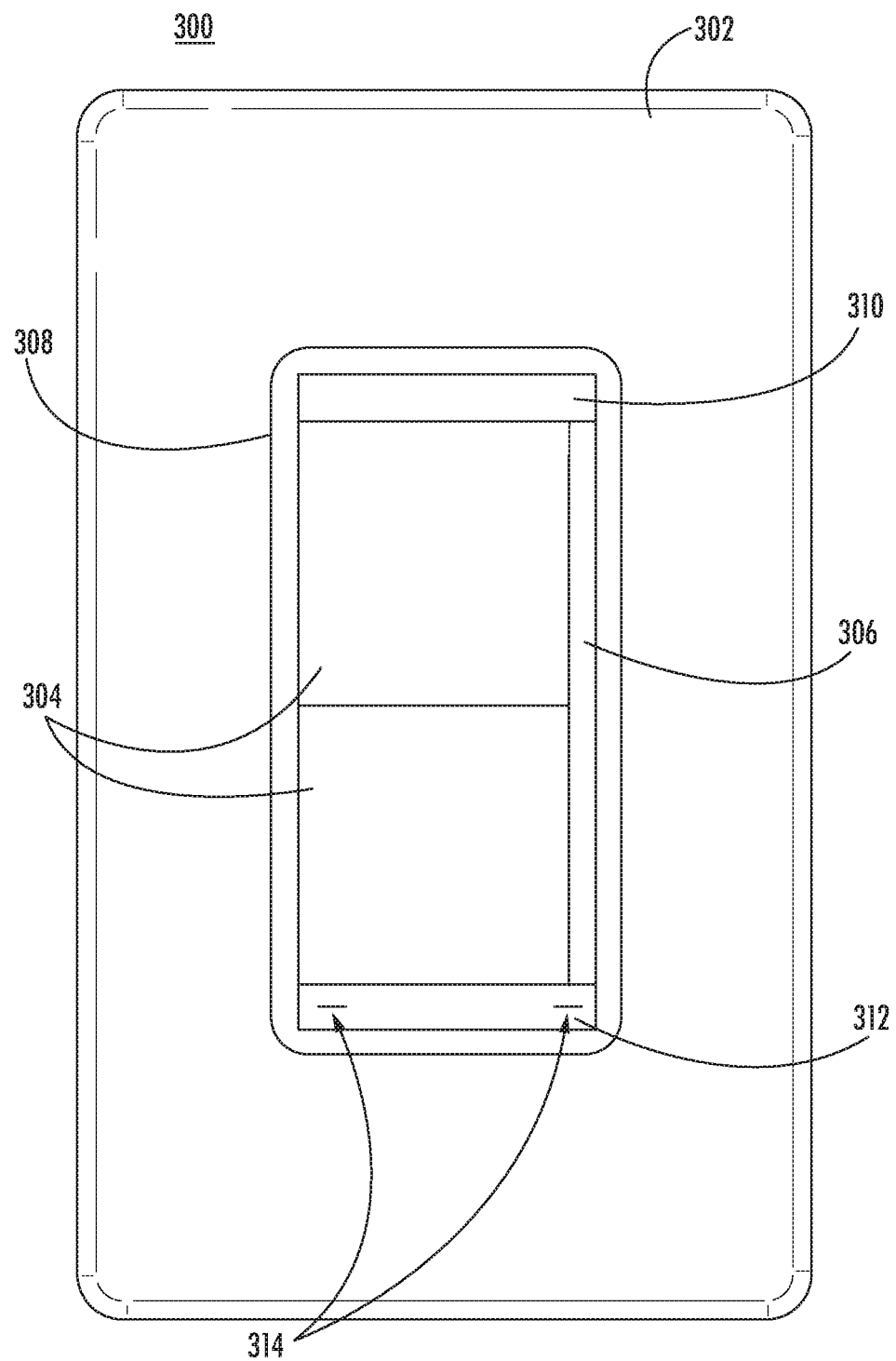
FIG. 3 illustrates a first exemplary embodiment of the load control device depicted in FIGS. 1 and 2.

FIG. 3 illustrates a first exemplary embodiment of a load control device having integrated voice control 300. The load control device 300 may represent the load control device 102 as depicted in FIGS. 1 and 2. FIG. 3 illustrates physical components and features of the load control device 300. FIG. 3 illustrates an exemplary form factor of the load control device 300. The load control device 300 is not limited to the form factor shown in FIG. 3 as the arrangement of the constituent components of the load control device 300 may be varied in size, shape, and position as will be appreciated by a person of ordinary skill in the art.

The load control device 300 may be a single gang line voltage powered device that may fit into a standard NEMA electrical junction box. As such, the load control device 300 may include a strap for mounting the load control device to a standard NEMA electrical junction box. As shown in FIG. 3, the load control device 300 may include a wall plate 302. The wall plate 302 may provide an outer frame for the load control device 300. The wall plate 302 may be provided with screws or may be a screwless wall plate.

The load control device 300 may further include activity buttons 304, a dimmer control component 306, an LED display 308, an integrated speaker 310, a mute button 312, and one or more microphones 314 (e.g., a far field microphone). The activity buttons 304 may be used to adjust operation of the load control device 300—for example, to turn a lighting load coupled to the control device 302 ON and OFF. The dimmer control component 306 may be used to adjust a dimming state of the lighting load coupled to the control device 302. The activity buttons 304 and/or the dimmer control component 306 may be mechanical components and/or may be capacitive-based components that may be engaged or manipulated by a user through touch. The activity buttons 304 may be used for a variety of purposes including manually activating the integrated voice controller and power cycling/restarting the load control device 300.

The LED display 308 may include one or more LEDs. The LED display 308 may form a border around the main components of the load control device 300. As described herein, the LED display 308 may visually depict a state of operation or mode of the load control device 300 and/or connected voice service such as, for example, whether the load control device 300 is turned ON, the integrated voice service is working to answer a voiced query from a user, etc. Other visual information or feedback that may be provided by the LED display 308 may include: operations/modes for indicating dimming or brightness levels; load status; indicate voice controller operation states including, for example, thinking, listening, speaking, etc.; indicate a setup and/or configuration mode; indicate a muted or privacy state; indicate device connectivity status; indicate a diagnostic state such as indicating whether the device is connected to Wi-Fi; provide notifications including, for example, indicate an incoming call, an alarm, or indicate expiration of a timer; provide proprietary notifications such as, for example, My Leviton notifications including, for example, to indicate status of an activity or indicate an appliance or lighting device is turned on or drawing power for too long, etc.; providing a light or locator light such as, for example, a night light, which can be activated based on motion detection when a user enters the location of the load control device; locator or status light to indicate location of a button or engageable feature or to indicate a power state of the load control device (e.g., status light can be ON when load is turned off and OFF when load is turned ON); etc.

The integrated speaker 310 may provide audible outputs such as, for example, voiced responses from the integrated voice controller (e.g., voice assistant feedback). The microphone 314 may receive audible inputs for the integrated voice controller of the load control device 300 to receive verbal commands and/or queries from the user (e.g., voice control input).

The mute button 312 may be used to provide muting and/or privacy capabilities. When activated, the load control device 102 may be programmed to cease listening for audible information. The load control device 102 may be controlled to be muted so as not to generate any audible output signal.

The load control device 300 may interface with an app (e.g., the My Leviton app) provided on a remote mobile computing device (e.g., the mobile device 122). The load control device 300 may be set up and controlled by a user through, for example, the My Leviton app. Further, firmware updates, model number, firmware number information, etc. of the load control device 300 may be provided to the user through the My Leviton app. Other diagnostic data for the load control device 300 may be provided to the user through the My Leviton app.

The load control device 300 may further include one or more "hot" buttons that can include any type of engageable feature that can be manipulated by a user, with the "hot" button assigned a different input role based on a current operational state of the load control device 300. The load control device 300 may include an input for cycling power and/or turning power ON and/or OFF.

Figure 4:
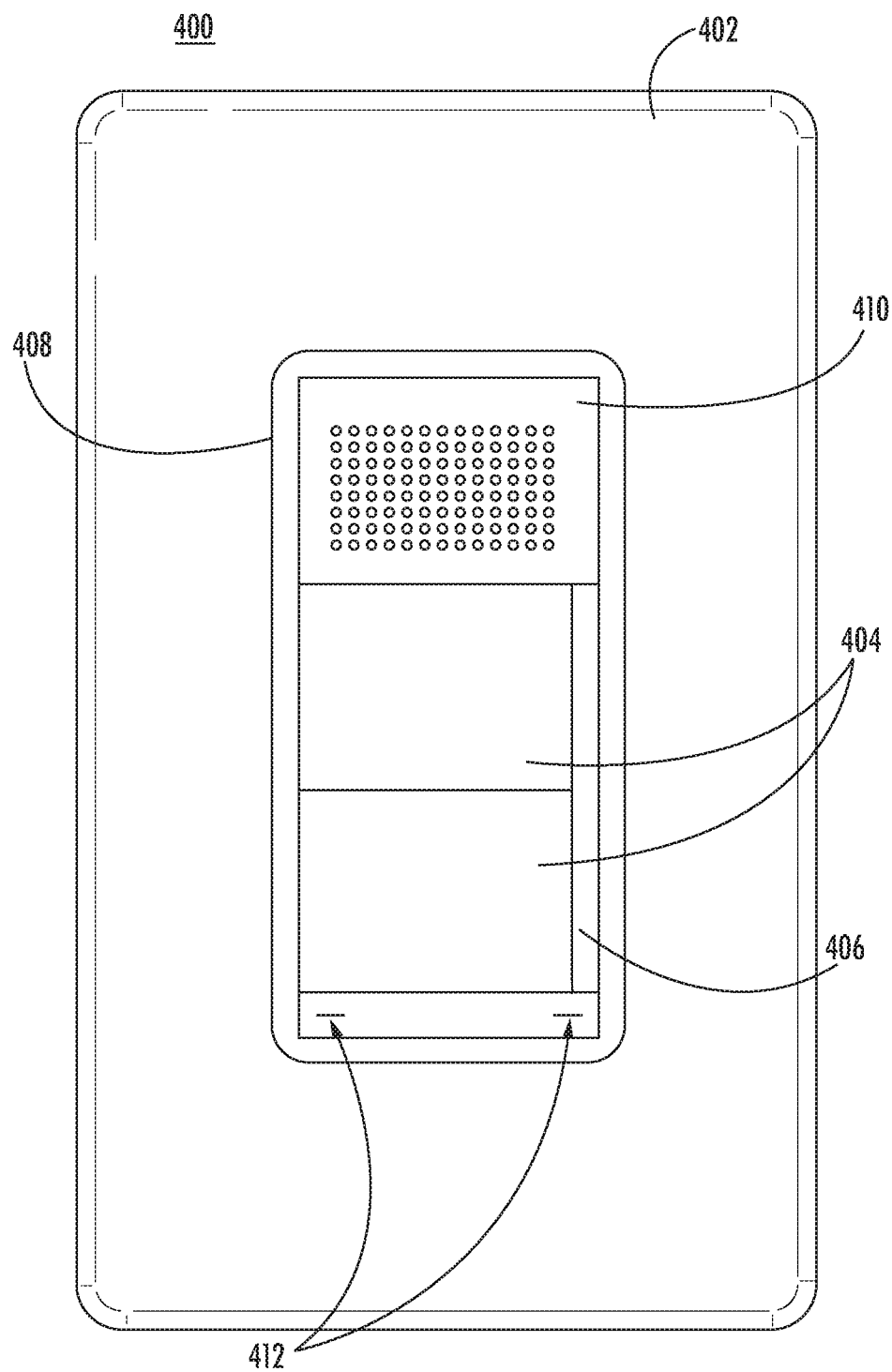
FIG. 4 illustrates a second exemplary embodiment of the load control device depicted in FIGS. 1 and 2.

FIG. 4 illustrates a second exemplary embodiment of a load control device having integrated voice control 400. The load control device 400 may represent the load control device 102 as depicted in FIGS. 1 and 2. FIG. 4 illustrates physical components and features of the load control device 400. FIG. 4 illustrates an exemplary form factor of the load control device 400. The load control device 400 is not limited to the form factor shown in FIG. 4 as the arrangement of the constituent components of the load control device 400 may be varied in size, shape, and position as will be appreciated by a person of ordinary skill in the art. The load control device 400 can be an alternative design of the load control device 300 and can include substantially the same components and capabilities—as such, a detailed discussion of the constituent components of the load control device 400 is not provided herein but is instead made in reference to similar components described in relation to FIG. 3.

The load control device 400 may be a single gang line voltage powered device that may fit into a standard NEMA electrical junction box. As such, the load control device 400 may include a strap for mounting the load control device to a standard NEMA electrical junction box. As shown in FIG. 4, the load control device 400 may include a wall plate 402. The wall plate 402 may provide an outer frame for the load control device 400. The wall plate 402 may be provided with screws or may be a screwless wall plate. The load control device 400 may further include activity buttons 404, a dimmer control component 406, an LED display 408, an integrated speaker 410, and one or more microphones 312 (e.g., a far field microphone). The load control device 400 may further include a mute button (not depicted in FIG. 4 for simplicity).

Figure 5:
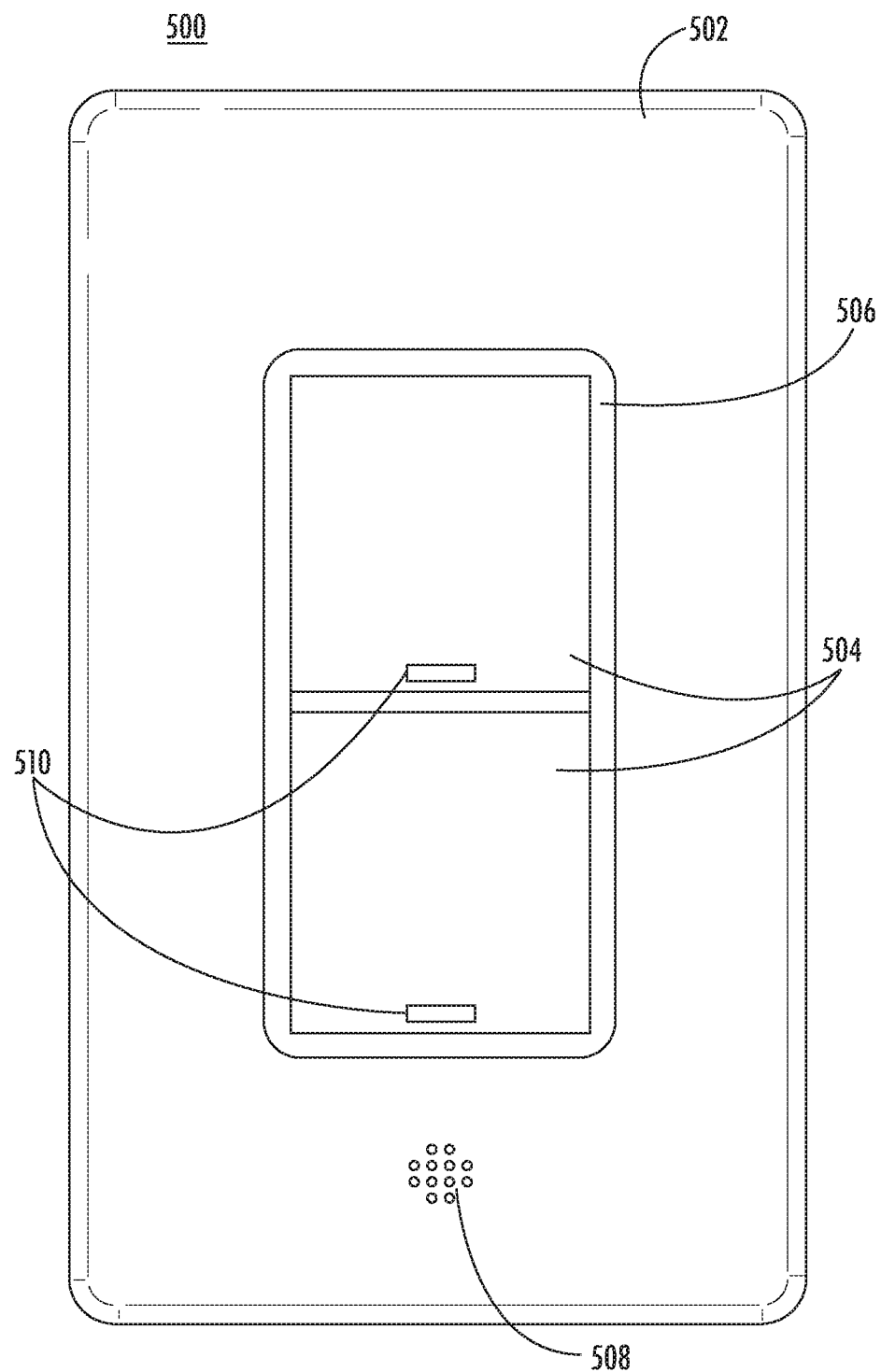
FIG. 5 illustrates a third exemplary embodiment of the load control device depicted in FIGS. 1 and 2.

FIG. 5 illustrates a third exemplary embodiment of a load control device having integrated voice control 500. The load control device 500 may represent the load control device 102 as depicted in FIGS. 1 and 2. FIG. 5 illustrates physical components and features of the load control device 500. FIG. 5 illustrates an exemplary form factor of the load control device 500. The load control device 500 is not limited to the form factor shown in FIG. 5 as the arrangement of the constituent components of the load control device 500 may be varied in size, shape, and position as will be appreciated by a person of ordinary skill in the art. The load control device 500 can be an alternative design of the load control device 300 and the load control device 400 and can include substantially the same components and capabilities—as such, a detailed discussion of the constituent components of the load control device 500 is not provided herein but is instead made in reference to similar components described in relation to FIGS. 3 and 4.

The load control device 500 may be a single gang line voltage powered device that may fit into a standard NEMA electrical junction box. As such, the load control device 500 may include a strap for mounting the load control device to a standard NEMA electrical junction box. As shown in FIG. 5, the load control device 500 may include a wall plate 502. The wall plate 502 may provide an outer frame for the load control device 500. The wall plate 502 may be provided with screws or may be a screwless wall plate. The load control device 500 may further include activity buttons 504, and LED display 506, and integrated speaker 508, and indicators 510. The load control device 500 may further include a dimmer control component, a microphone, a mute button (not shown for simplicity), etc.

The indicators 510 can provide visual display for indicating a status of the load control device 500. In various embodiments, the indicators 510 can be associated with one of the two shown activity buttons 504 and can indicate a status of the activity buttons. For example, if the lower activity button 504 is engaged or has been pressed to turn a coupled load OFF, then the lower indictor 510 can be illuminated as shown in FIG. 5. The indicators 510 can also provide illumination for locating the load control device 500 in a location with low light levels.

Figure 6:
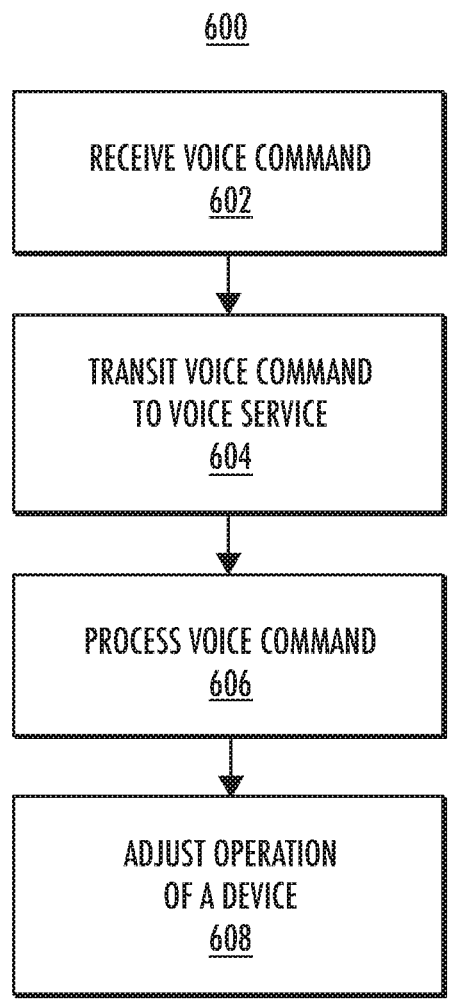
FIG. 6 illustrates a logic flow associated with a load control device having integrated voice control according to an exemplary embodiment.

FIG. 6 illustrates a logic flow 600 associated with a load control device having integrated voice control (e.g., load control device 102). The logic flow 600 may begin with block 602. However, the logic flow 600 may begin with a different block other than the block 602. Furthermore, the logic flow 600 is not illustrated in a particular order. A different order other than that illustrated may be used. Some or all of the communications and operations associated with the logic flow 600 may be embodied as one or more computer executable instruction. Such computer executable instructions may be stored in a storage medium, such the memory 230 and/or database 232 as depicted in FIG. 2. A computing device, such as the processor circuit 228 and/or remote processor 232 as depicted in FIG. 2, may execute the stored computer executable instructions. The logic flow 600 may represent operations performed by any of the load control devices described herein.

At block 602, the load control device can receive a voice command. The voice command can be spoken by a user in relatively close proximity to the load control device. The voice command can be detected as a voice signal by the load control device using one or more microphones.

At block 604, the load control device can transmit the received voice command to a voice service. The voice service can be part of a remote cloud-based voice service platform and can be an integrated feature of the load control device that received the voice command. The remote cloud-based voice service platform can be a proprietary or third-party voice service platform capable of receiving and decoding voice commands. The load control device can transmit the received voice command over a wired or wireless interface to the remote cloud-based voice service platform.

At block 606, the voice command can be processed. In particular, the remote cloud-based voice service platform can determine what instruction was received by the load control device at block 602. In various embodiments, the remote cloud-based voice service platform can further determine a device associated with the instruction. In various embodiments, rather than an instruction being determined, a user query can be determined.

At block 608, operation of a device can be adjusted based on the processed voice command. The device can be determined based on the decoded voice command. The device can be a local device—for example, located in relative close proximity to the load control device—or can be a remote device—for example, located in a different environment relative to the load control device. The device can be any type of device including a lighting device or a non-lighting device. The device can be a smart device, IoT device, or any type of device capable of being controlled or managed through a communications interface. The controlled device can also include the load control device. The voice service can control operation of the device directly—for example, by being coupled directly to the remote cloud-based voice service platform. Alternatively, the voice service can control operation of the device indirectly—for example, by communicating the voice command to a third-party cloud service platform that is coupled directly to the remote cloud-based voice service platform.

In operation, in a preferred embodiment, the load control device of the present disclosure may enable a user to control any device in, for example a home. For example, in a preferred embodiment, a load control device according to the present disclosure may be located adjacent an entryway in a home. A user, upon arriving or departing the home, may issue a voice command to, for example, turn OFF all bedroom lights. Upon detection of the voice command, the load control device may transmit the voice command to a third-party cloud service platform such as, for example, Amazon's cloud service platform, which may transmit the voice command to a proprietary cloud service platform such as, for example, the My Leviton platform, which may transmit the voice command to a router located in the home to control, for example, the Wi-Fi enabled lighting devices (e.g., bedroom lights). In operation, the voice command can be processed anywhere in the system.

Figure 7:
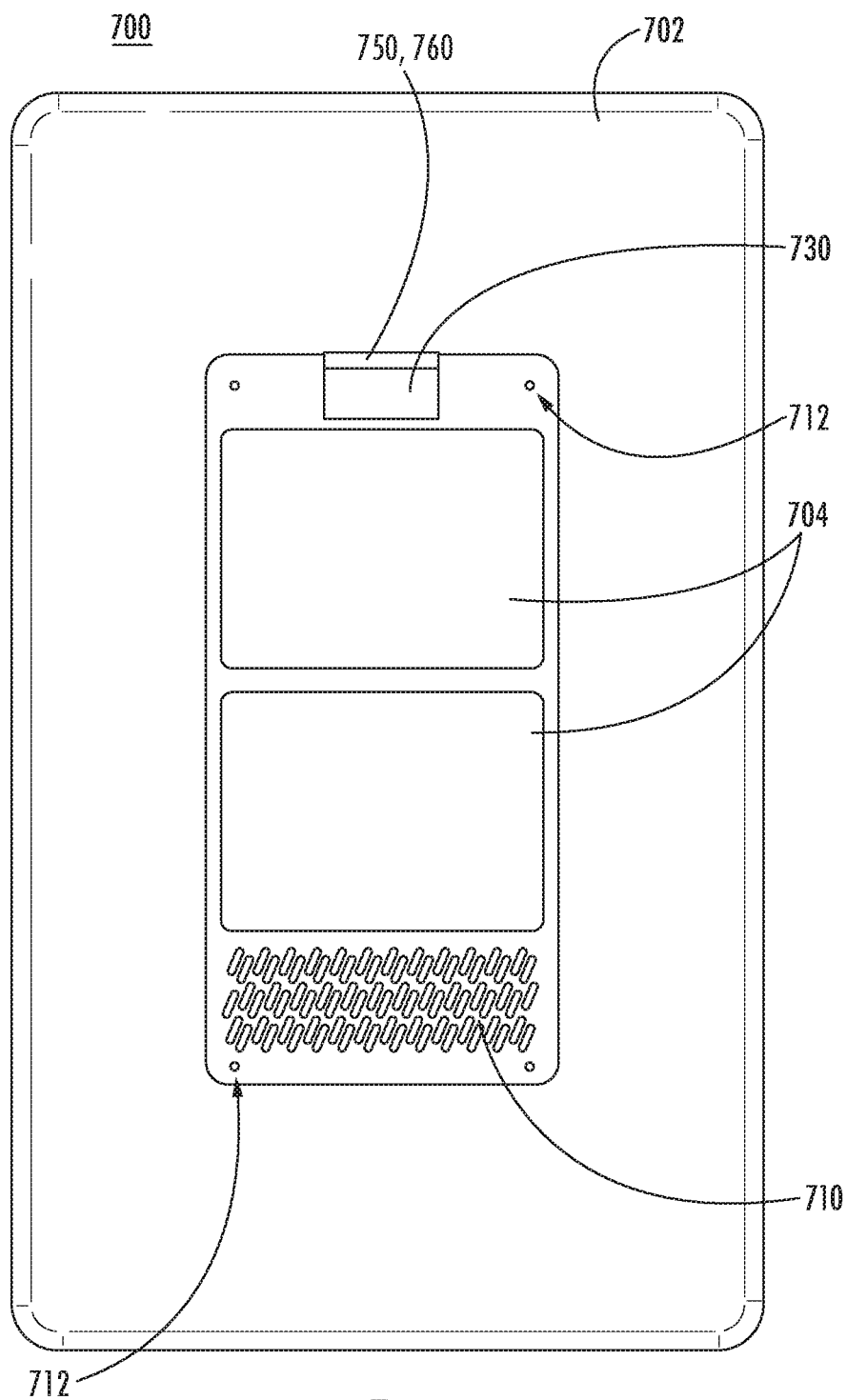
FIG. 7 is a fourth exemplary embodiment of the load control device depicted in FIGS. 1 and 2.

FIG. 7 illustrates a fourth exemplary embodiment of a load control device 700 having integrated voice control. The load control device 700 may represent the load control device 102 as depicted in FIGS. 1 and 2. FIG. 7 illustrates various physical components and features that may be incorporated into the load control device 700. FIG. 7 illustrates an exemplary form factor of the load control device 700. The load control device 700 is not limited to the form factor shown in FIG. 7 as the arrangement of the constituent components of the load control device 700 may be varied in size, shape, and position as will be appreciated by a person of ordinary skill in the art. The load control device 700 can be an alternative design of the load control device 300, 400, 500 and can include substantially the same components and capabilities—as such, a detailed discussion of the constituent components of the load control device 700 is not provided herein but is instead made in reference to similar components described in relation to FIGS. 3, 4 and/or 5

Figure 8:
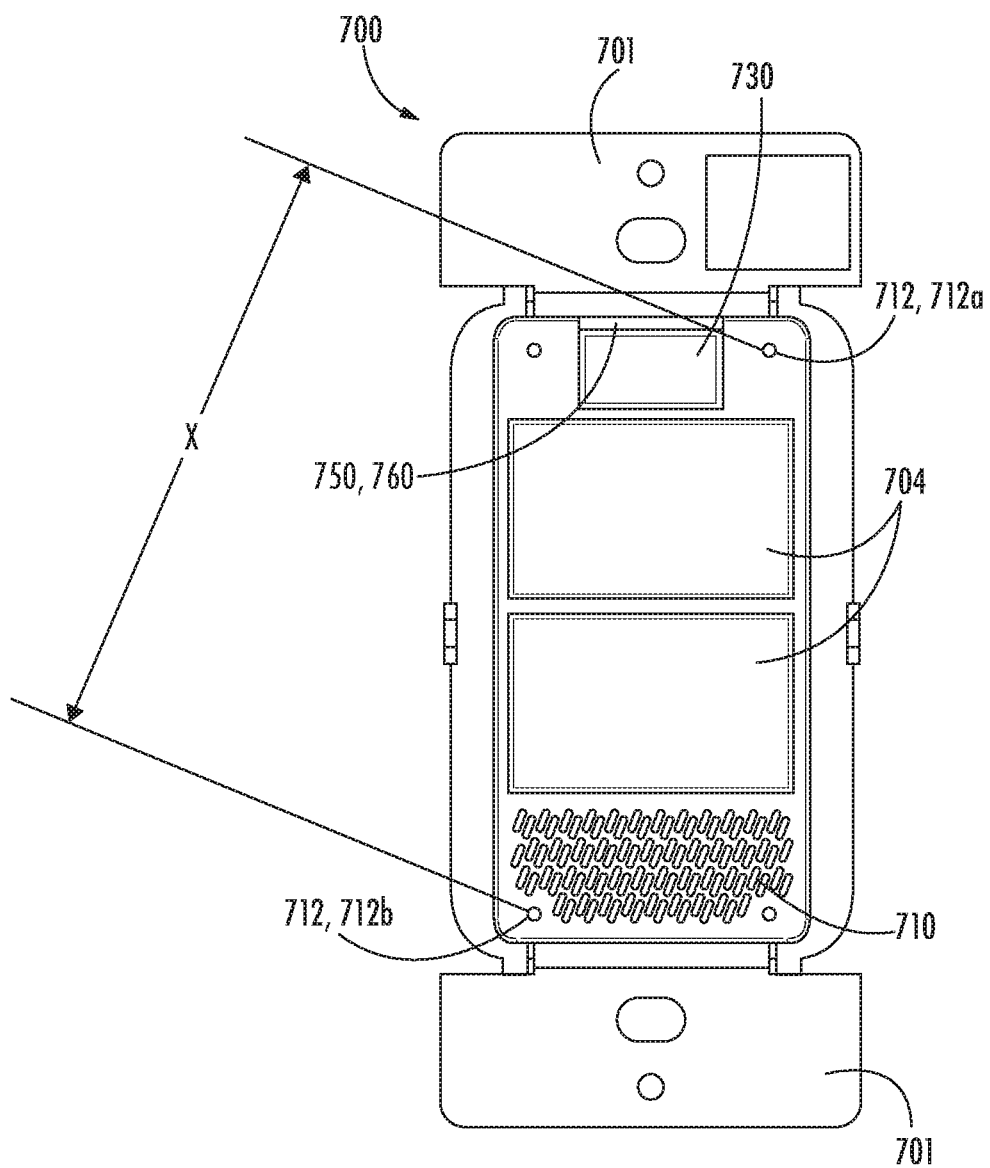
FIG. 8 is a front view of the load control device depicted in FIG. 7.

The load control device 700 may be a single gang line voltage powered device that may fit into a standard NEMA electrical junction box. As such, the load control device 700 may include a strap 701 (FIG. 8) for mounting the load control device 700 to a standard NEMA electrical junction box. As shown in FIG. 7, the load control device 700 may include a wall plate 702. The wall plate 702 may provide an outer frame for the load control device 700. The wall plate 702 may be provided with screws or may be a screwless wall plate. The load control device 700 may further include activity buttons 704, an integrated speaker 710, one or more microphones 712 (e.g., a far field microphone) (FIG. 8), etc. The load control device 700 may further include a mute/unmute button 730 and an air-gap switch 750, as will be described in greater detail below.

As mentioned, the load control device 700 may include one or more microphones 712 for receiving voice commands, instructions, or queries from a user. In accordance with one aspect of the present disclosure, referring to FIG. 8, in one example embodiment, the load control device 700 may include first and second microphones 712a, 712b for detecting audible commands and queries from the user. In order to optimize or increase performance of the load control device 700, it is desirable to position the first and second microphones 712a, 712b as far apart from each other as possible. However, positioning of the first and second microphones 712a, 712b must be balanced against the tight space limitations associated with designing an in-wall, single gang load control device. In this manner, it has been discovered that positioning the first and second microphones 712a, 712b in opposite diagonal corners of the load control device 700 provides maximum distance between the first and second microphones 712a, 712b and increases the overall performance of the load control device 700 for achieving far-field voice capability. That is, by maximizing the distance between the first and second microphones 712a, 712b, improved recognition of voice speech commands can be achieved (e.g., maximizing the distance between the first and second microphones 712a, 712b enables improved acoustical input that the audio processing algorithms can use to more accurately recognize voice speech commands via, for example, improved noise and echo cancellation).

As illustrated, the load control device 700 may include a first microphone 712a positioned in the top, right corner of the load control device 700 and a second microphone 712b positioned in the bottom, left corner of the load control device 700, although it is envisioned that the first and second microphones 712a, 712b may be positioned in other locations. For example, the first microphone 712a may be positioned in the top, left corner and the second microphone 712b may be positioned in the bottom, right corner. In one example embodiment, it has been discovered that by positioning the first and second microphones 712a, 712b in opposite, diagonal corners, a maximum distance X between the first and second microphones 712a, 712b can be achieved. For example, in one embodiment, a distance X of approximately 63 mm or (2.5 inches) can be provided.

In accordance with another aspect of the present disclosure, it has been discovered that optimized or increased performance of the load control device 700 can be achieved by isolating the one or more microphones 712 from the other internal components of the load control device 700. That is, for example, to increase performance of the load control device 700, the one or more microphones 712 may be acoustically isolated from the other internal components of the load control device 700 to minimize the microphones 712 from picking up miscellaneous internal sounds. In one example embodiment, the one or microphones 712 may be acoustically isolated by, for example, a gasket or the like.

Figure 9:
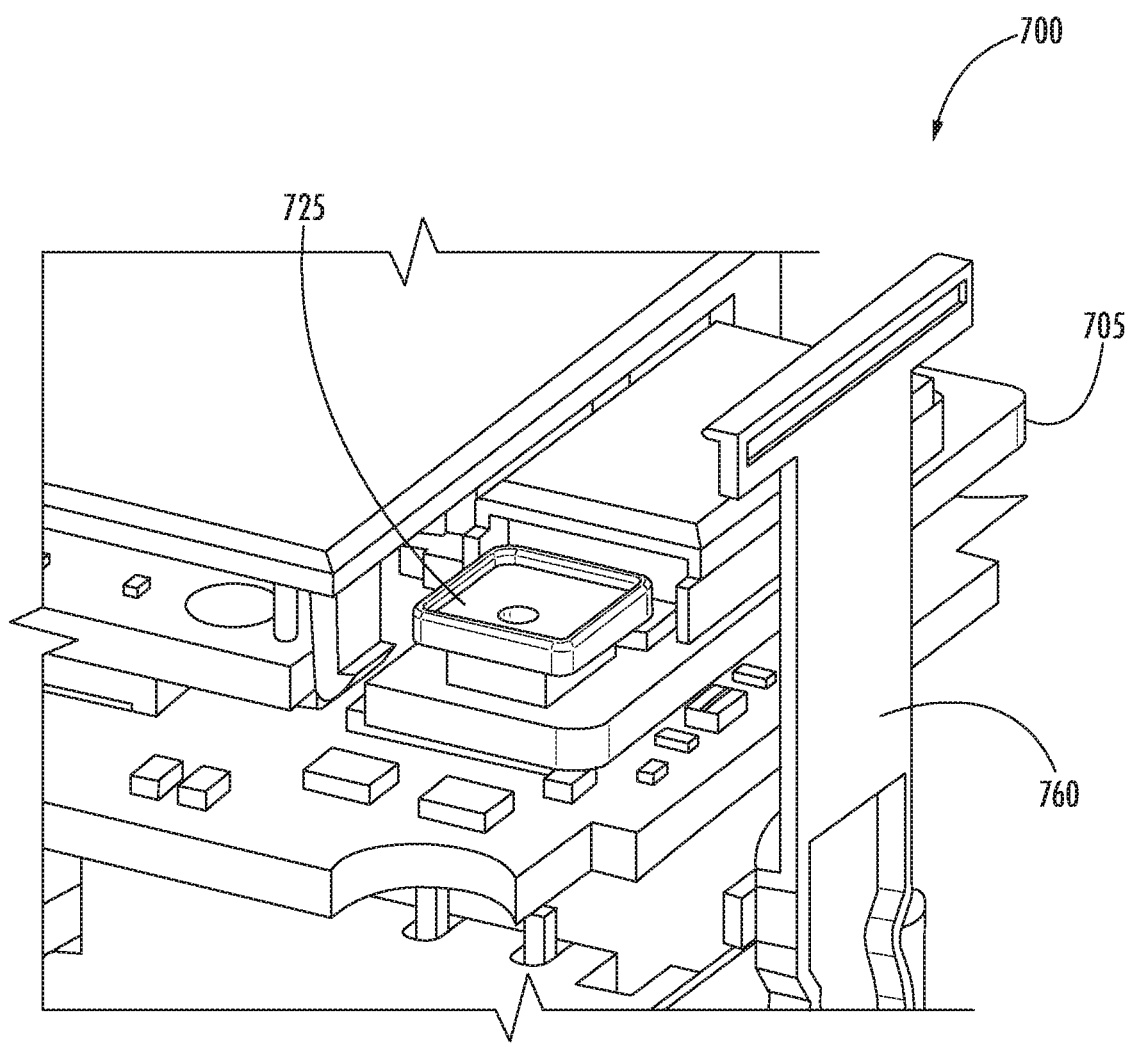
FIG. 9 is a partial, perspective view of an exemplary embodiment of a gasket for use with a microphone associated with the load control device depicted in FIG. 7 according to one aspect of the present disclosure.

Referring to FIG. 9, in one example embodiment, the load control device 700 may include one or more microphones (not shown) such as, for example, microphone 712a and/or 712b. In use, the microphone 712 may be isolated from other internal components of the load control device 700 by a gasket 725. That is, for example, the load control device 700 may include one or more microphones 712 mounted to, for example, a printed circuit board (PCB) 705. Thereafter, a gasket 725 may be placed over the microphone 712 to encase the microphone 712 within the gasket 725. In one example embodiment, the gasket 725 may be manufactured from a flexible material such as, for example, a rubber or the like. In addition, the gasket 725 is arranged and configured to enable sound to pass therethrough, for example, the gasket 725 may include one or more holes formed therein for enabling sound to pass through. By incorporating the gasket 725, it has been discovered that exterior sounds (e.g., voice commands from a user) are more focused for receipt by the microphone 712, while the effect of internal sounds on the microphone 712 are minimized.

As previously mentioned, the load control device 700 may also include one or more speakers such as, for example, speaker 710, for outputting sounds to the user. For example, the speaker 710 may output synthesized voices (e.g., responses from the integrated voice controller (e.g., voice assistant feedback)), music, an alarm, etc. In accordance with another aspect of the present disclosure, it has been discovered that optimized or increased performance (e.g., improved recognition of voice speech commands) of the load control device 700 can be achieved by isolating the speaker 710 from the other internal components of the load control device 700. That is, for example, to increase performance of the load control device 700, the one or more speakers 710 may be isolated from the other internal components of the load control device 700 to minimize, for example, vibrations and their unwanted impact. In one example embodiment, the speakers 710 may be isolated by, for example, gaskets or the like.

Figure 10A:
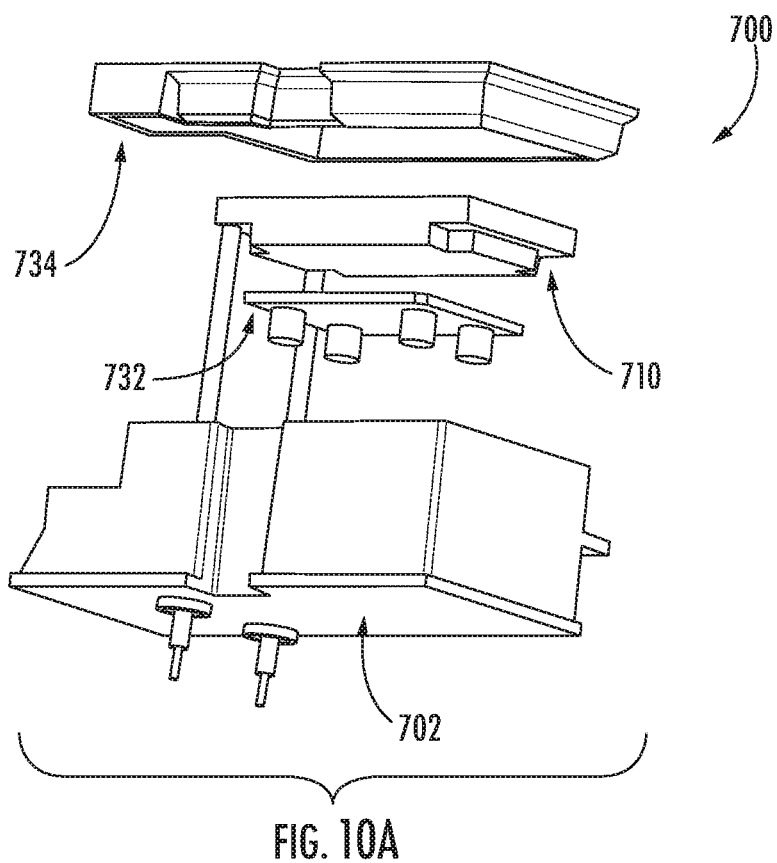
FIG. 10A is a partial, exploded perspective view of an exemplary embodiment of a gasket for use with a speaker associated with the load control device depicted in FIG. 7 according to one aspect of the present disclosure.
Figure 10B:
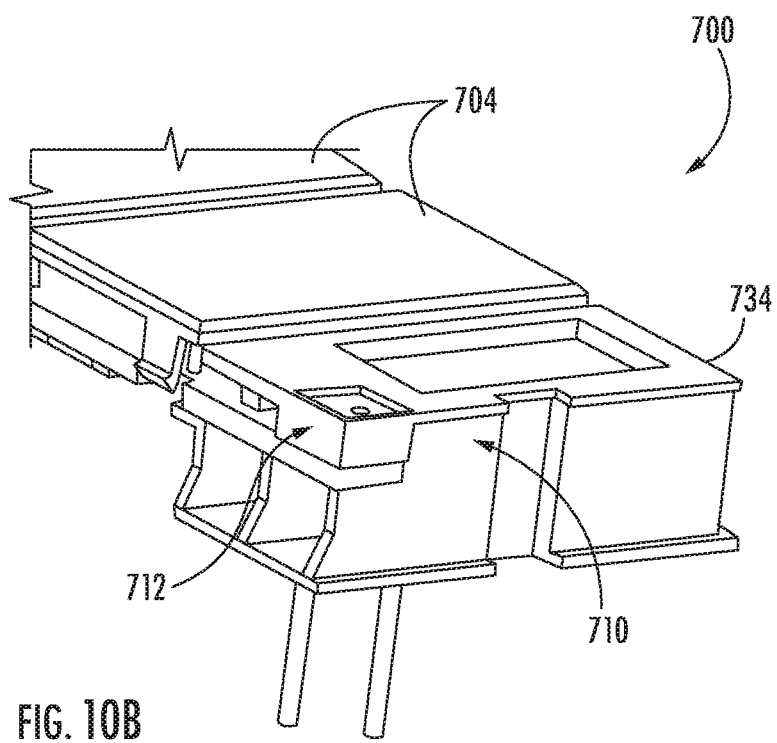
FIG. 10B is a partial, perspective view of the gasket depicted in FIG. 10A.

Referring to FIGS. 10A and 10B, in one example embodiment, the load control device 700 may include one or more speakers 710. In use, the speaker 710 may be isolated from other internal components of the load control device 700 by first and second gaskets 732, 734. That is, for example, the load control device 700 may include a speaker enclosure 702 having an internal cavity. In use, the speaker 710 may be positioned within the interior cavity of the speaker enclosure 702. First and second gaskets 732, 734 may be positioned on either side of the speaker 710. In use, the first or rear gasket 732, positioned to the relative rear of the speaker 710, operates to isolate, or at least minimize, mechanical vibrations caused by the speaker 710 during sound output from affecting other internal components in the load control device 700, thus increasing audio performance. The second or front gasket 734, positioned to the front of the speaker 710, operates to isolate, or at least minimize, air pressure from the front of the cone to the rear of the cone (e.g., the gaskets minimize the interaction of air pressure at a front surface of a cone of the speaker from the air pressure at a rear surface of the cone).

The second or front gasket 734 may be arranged and configured to enable sound to pass therethrough, for example, the second or front gasket 734 may include one or more holes formed therein for enabling sound to pass through. In one example embodiment, the gaskets 732, 734 may be manufactured from a flexible material such as, for example, a rubber or the like. As illustrated, in one example embodiment, the first and second gaskets 732, 734 act to encompass, surround, encase, etc. the front and rear surfaces of the speaker 710. In addition, as illustrated, in one example embodiment, the second or front gasket 734 may also act to encompass a microphone 712, such as, for example microphone 712b. In this manner, the need for separate gaskets for the speaker and microphone is eliminated.

In accordance with another aspect of the present disclosure, referring to FIG. 7, an air-gap switch 750 may be incorporated. As will be appreciated by one of ordinary skill in the art, an air-gap switch is a switch such as, for example, a manual switch to completely shut off or disconnect power to the load so that, for example, a user can physically interrupt the flow of power (e.g., electricity) from the load control device to the load so that the load can be worked on, replaced, etc. without the fear that power to the load may be accidentally turned on.

Figure 11A:
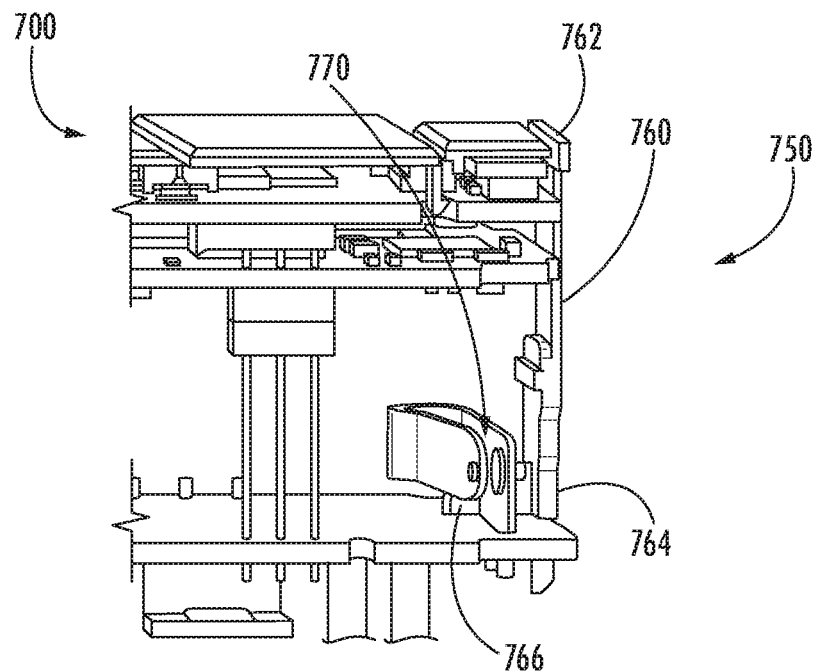
FIG. 11A is a partial, perspective view of an exemplary embodiment of an air-gap switch for use with the load control device depicted in FIG. 7 according to one aspect of the present disclosure, the air-gap switch illustrated in the first or closed position.
Figure 11B:
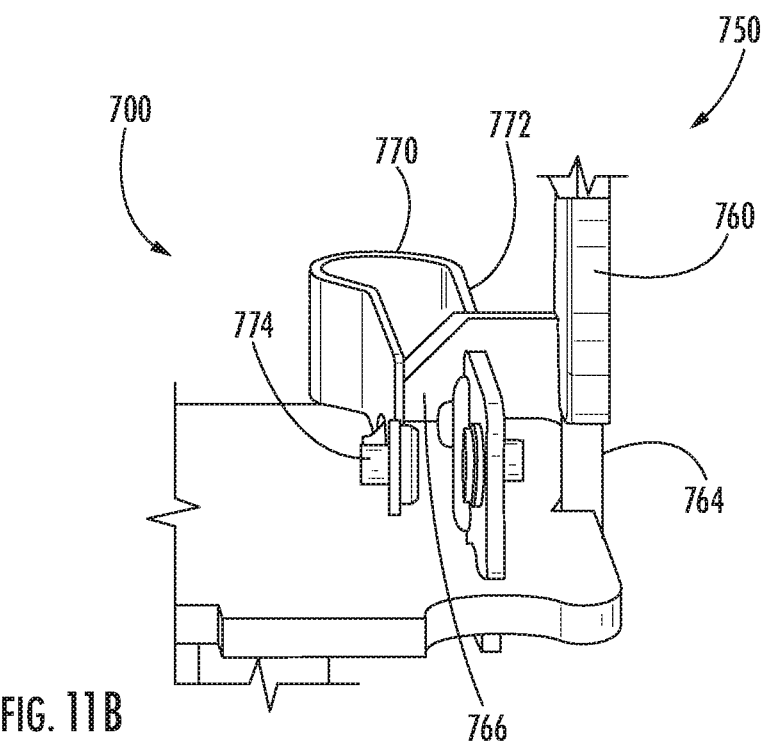
FIG. 11B is a detailed, partial, perspective view of the air-gap switch depicted in FIG. 11A, the air-gap switch illustrated in the second or open position.

Referring to FIGS. 11A and 11B, in one example embodiment, the load control device 700 may include an air-gap switch 750, the air-gap switch 750 including an actuator 760 operatively associated with an electrical contact 770. As illustrated, the electrical contact 770 may include a first arm or segment 772 and a second arm or segment 774. In use, the electrical contact 770 is biased closed so that the first and second arms 772, 774 are in electrical contact with each other. In this manner, electricity can flow to the load. Although the electrical contact has been illustrated and described as being an integral component, it is envisioned that the electrical contact 770 may include first and second arms that are separately formed.

In use, the air-gap switch 750, and specifically the actuator 760, is movable between a first position (FIG. 11A) and a second position (FIG. 11B). As illustrated, the actuator 760 may include a first end 762 and a second end 764. The first end 762 may be accessible to a user, for example, through a front surface of the load control device 700 as depicted in FIG. 7. The second end 764 may include a projection 766 extending therefrom for interacting with the electrical contact 770. In use, with the actuator 760 in the first position (FIG. 11A), the electrical contact 770 is in the closed position (e.g., the first and second arms 772, 774 are in electrical contact with each other) so that electricity can flow to the connected load. However, with the actuator 760 moved to the second position (FIG. 11B), the projection 766 formed at the second end 764 of the actuator 764 contacts the second arm 774 of the electrical contact 770 to separate or form a gap between the first and second arms 772, 774 of the electrical contact 770 to prevent the flow of electricity to the load. In one example embodiment, the actuator 760 may be pulled by a user to move from the first position to the second position. As such, when the user pulls the actuator 760, the first and second arms 772, 774 of the electrical contact 770 are separated from each other thereby forming an air gap between the first and second arms 772, 774 completely disconnecting power from the load control device.

In accordance with another aspect of the present disclosure, referring to FIG. 7, in one example embodiment, given, for example, user's privacy concerns, the load control device 700 may include a mute/unmute button 730 so that, in use, the load control device 700, and in particular, the microphones 712, are arranged and configured so that they can be selectively muted and unmuted. For example, in one example embodiment, the load control device 700 and microphones 712, may be arranged and configured to ensure that the microphones 712 cannot be unmuted by manipulating the device software (e.g., hacking the device software). For example, in one embodiment, the device 700 is arranged and configured so that, once in the mute state, the microphones 712 can only be unmuted by pressing a button on the device, such as, for example, the mute/unmute button 730. In this manner, the load control device 700 can enter into a mute state via a physical button located on the device 700 or from a virtual button in an APP loaded onto a user device (e.g., smartphone). In use, when the load control device 700 is muted, be it from the APP or from the mute button 730, the microphones 712 are electronically disconnected by removing their operating power. Thus, in one example embodiment, the load control device 700 may be arranged and configured so that the one or more microphones 712 can be muted via either a physical button 730 located on the load control device 700 or via an associated APP running on a user's device (e.g., smartphone). However, the one or more microphones 712 can only be unmuted via the physical button 730 located on the load control device 700. By preventing the one or more microphones 712 from being unmuted via the APP, the risk of a third party being able to unmute the load control device 700 using software alone would be eliminated, thus minimizing privacy concerns.

In accordance with another aspect of the present disclosure, in one example embodiment, the load control device 700 is arranged and configured to include a device depth (e.g., as measured from the wall surface to the rear surface of the device) when installed of approximately 1.3 inches. That is, by arranging the electronic and mechanical components to fit in a more condensed space including, for example, a layered PCB layout, a reduced footprint was achieved. In this manner, the load control device provides additional room in the wall-box for connecting the necessary wiring for installation, thus simplifying installation.

While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

We claim:

1. An in-wall load control device having integrated voice control, comprising:
   a housing having a front surface, wherein the in-wall load control device is configured to have a wall plate coupled thereto, wherein the front surface is configured to be accessible through an opening formed in the wall plate;
   a strap to fasten the housing to an electrical box located in a wall or ceiling;
   an activity button;
   a first microphone;
   a second microphone; and
   a speaker,
   wherein the first and second microphones are respectively arranged to diagonally opposing corners of the front surface of the housing, wherein the front surface includes first and second points lying thereon, wherein the first and second points arranged and configured to provide a maximum distance therebetween allowable by the front surface, the first and second microphones arranged to the first and second points,
   wherein the first microphone is encased in a first gasket, the second microphone is encased in a second gasket, a third gasket is positioned in front of the speaker, and a fourth gasket is positioned behind the speaker to vibrationally isolate the speaker from the first and second microphones.

2. The in-wall load control device of claim 1, wherein the first microphone is positioned in a top, right corner of the front surface of the housing of the load control device, the second microphone is positioned in a bottom, left corner of the front surface of the housing of the load control device.

3. The in-wall load control device of claim 1, wherein the first microphone is positioned in a top, left corner of the front surface of the housing of the load control device, the second microphone is positioned in a bottom, right corner of the front surface of the housing of the load control device.

4. The in-wall load control device of claim 1, wherein the first and second microphones are positioned a distance of 2½ inches apart from each other.

5. The in-wall load control device of claim 1, wherein the third gasket includes an aperture formed therein for enabling sound to pass through.

6. The in-wall load control device of claim 1, wherein the gaskets encasing the first and second microphones, respectively, each include an aperture formed therein for enabling sound to pass through.

7. The in-wall load control device of claim 1, further comprising an actuator, wherein movement of the actuator transitions the first and second microphones between a muted state and an unmuted state.

8. The in-wall load control device of claim 7, wherein the load control device is in communication with an APP running on a user device, the APP being arranged and configured to transition the first and second microphones to the muted state, the load control device being arranged and configured so that the first and second microphones can only be transitioned to the unmuted state via the actuator.

9. The in-wall load control device of claim 1, further comprising:
   a processor; and
   a memory coupled to the processor, the processor configured to receive voice commands via the microphone from a user and to communicate with a remote device.

10. The in-wall load control device of claim 9, wherein the processor is configured to transmit the voice commands to a remote service platform, the load control device is configured to adjust an operation of a local device based on receiving a voice command from the remote service platform.

11. An in-wall load control device having integrated voice control, comprising:
    a housing having a front surface, wherein the in-wall load control device is configured to have a wall plate coupled thereto, wherein the front surface is configured to be accessible through an opening formed in the wall plate;
    a strap to fasten the housing to an electrical box located in a wall or ceiling;
    an activity button;
    a first microphone encased in a first gasket arranged and configured to vibrationally isolate the microphone from internal components of the in-wall load control device;
    a second microphone encased in a second gasket arranged and configured to vibrationally isolate the microphone from internal components of the in-wall load control device;
    a speaker for outputting sounds to a user, wherein a third gasket is positioned in front of the speaker and a fourth gasket is positioned behind the speaker to vibrationally isolate the speaker from internal components of the in-wall load control device; and
    wherein the first and second microphones are respectively arranged to diagonally opposing corners of the front surface of the housing, wherein the front surface includes first and second points lying thereon, wherein the first and second points arranged and configured to provide a maximum distance therebetween allowable by the front surface, the first and second microphones arranged to the first and second points.

12. The in-wall load control device of claim 11, further comprising an actuator wherein movement of the actuator transitions the microphone between a muted state and an unmuted state.

13. The in-wall load control device of claim 12, wherein the load control device is in communication with an APP running on a user device, the APP being arranged and configured to transition the microphones to the muted state, the load control device being arranged and configured so that the microphone can only be transitioned to the unmuted state via the actuator.

* * * * *